United States Patent
Parks et al.

(10) Patent No.: US 7,559,877 B2
(45) Date of Patent: Jul. 14, 2009

(54) INTERACTIVE EXERCISE DEVICE AND SYSTEM

(75) Inventors: Susan B. Parks, Laguna Niguel, CA (US); Dennis Parks, Laguna Niguel, CA (US); Richard Sagey, Laguna Niguel, CA (US); Chuck Kalina, Irvine, CA (US)

(73) Assignee: Walkstyles, Inc., Laguna Hills, CA (US)

( * ) Notice: Subject to any disclaimer, the term of this patent is extended or adjusted under 35 U.S.C. 154(b) by 861 days.

(21) Appl. No.: 11/087,670

(22) Filed: Mar. 24, 2005

(65) Prior Publication Data

US 2006/0217231 A1 Sep. 28, 2006

(51) Int. Cl.
*A63B 71/00* (2006.01)
(52) U.S. Cl. .................... 482/8; 482/3; 482/9; 600/300
(58) Field of Classification Search ................. 482/1–9; 455/90.3; 377/24.2; 600/300
See application file for complete search history.

(56) References Cited

U.S. PATENT DOCUMENTS

| | | | | |
|---|---|---|---|---|
| 765,992 | A * | 7/1904 | Porter | 235/105 |
| 1,131,062 | A | 3/1915 | Jenkins | |
| 4,159,416 | A | 6/1979 | Brejnik et al. | |
| 4,371,945 | A | 2/1983 | Karr et al. | |
| 4,387,437 | A * | 6/1983 | Lowrey et al. | 702/160 |
| 4,460,823 | A * | 7/1984 | Ruehlemann | 235/105 |
| 4,741,001 | A * | 4/1988 | Ma | 377/24.2 |
| 4,771,394 | A | 9/1988 | Cavanagh | |
| 4,780,864 | A * | 10/1988 | Houlihan | 368/10 |
| 4,846,459 | A | 7/1989 | Vivian | |
| 5,117,444 | A * | 5/1992 | Sutton et al. | 377/24.2 |
| 5,391,080 | A * | 2/1995 | Bernacki et al. | 434/254 |

(Continued)

OTHER PUBLICATIONS http://www.sporttek.co.uk/
Omron_Walking_style_Pedometer_HJ113.html, Mar. 22, 2005.

(Continued)

*Primary Examiner*—Fenn C Mathew
*Assistant Examiner*—Andrew M Tecco
(74) *Attorney, Agent, or Firm*—Greenberg Traurig LLP; Bradley D. Blanche

(57) ABSTRACT

An interactive exercise device for measuring and displaying exercise performance parameters, the interactive exercise device including a step measuring device that outputs a step signal corresponding to each step walked by a user, a processor for determining a plurality of exercise performance parameters based on the step signals output from the step measuring device, a memory for storing the determined exercise performance parameters, a menu-driven interface display for displaying a plurality of menus, the menus for displaying at least the determined exercise performance parameters, a user input device for operation by the user to select a display of one of the menus on the interface display and to provide input data corresponding to a selected display, and an interface connection for connecting the interactive exercise device to an external computing device, the interface connection supporting an upload of the determined exercise performance parameters from the interactive exercise device to the external computing device, and supporting a download of user-specified data from the external computing device to the interactive exercise device, the user-specified data including at least one user-specified message that is displayed on the interface display when a user-selected one of the determined exercise performance parameters reaches a user-specified threshold.

51 Claims, 21 Drawing Sheets

U.S. PATENT DOCUMENTS

| | | | |
|---|---|---|---|
| 5,524,637 A | | 6/1996 | Erickson |
| 5,890,995 A | | 4/1999 | Bobick et al. |
| 5,976,083 A | * | 11/1999 | Richardson et al. ......... 600/300 |
| 6,013,007 A | * | 1/2000 | Root et al. ..................... 482/8 |
| 6,044,257 A | * | 3/2000 | Boling et al. ............ 455/404.2 |
| 6,135,951 A | * | 10/2000 | Richardson et al. ......... 600/300 |
| 6,148,262 A | * | 11/2000 | Fry ........................... 701/213 |
| 6,322,482 B1 | | 11/2001 | Kim |
| 6,349,126 B2 | * | 2/2002 | Ogawa et al. .............. 377/24.2 |
| 6,450,922 B1 | | 9/2002 | Henderson et al. |
| 6,605,038 B1 | * | 8/2003 | Teller et al. ................. 600/300 |
| 6,607,483 B1 | | 8/2003 | Holland |
| 6,635,015 B2 | | 10/2003 | Sagel |
| 6,659,946 B1 | | 12/2003 | Batchelor et al. |
| 6,674,832 B2 | * | 1/2004 | Yusa ......................... 377/24.2 |
| 6,689,057 B1 | | 2/2004 | Shinsel et al. |
| 6,698,608 B2 | * | 3/2004 | Parker et al. ............... 220/4.22 |
| 6,702,719 B1 | | 3/2004 | Brown et al. |
| 6,837,827 B1 | * | 1/2005 | Lee et al. ....................... 482/8 |
| 6,856,934 B2 | * | 2/2005 | Vock et al. .................. 702/149 |
| 6,885,971 B2 | * | 4/2005 | Vock et al. .................. 702/182 |
| 7,292,867 B2 | * | 11/2007 | Werner et al. ............ 455/456.3 |
| 2002/0078367 A1 | * | 6/2002 | Lang et al. .................. 713/200 |
| 2004/0160571 A1 | * | 8/2004 | Jannard et al. .............. 351/158 |
| 2005/0209050 A1 | * | 9/2005 | Bartels ........................ 482/8 |
| 2006/0003709 A1 | * | 1/2006 | Wood ........................ 455/90.3 |

OTHER PUBLICATIONS http://www.nike.com/nikerunning/usa/v3/main.jhtml?ref=http://www.nike.com;bsessionid=QTU1VSZ2TDS, Mar. 22, 2005.

http://www.sportbrain.com/Home/home.cfm?page=productistep&istep=x&us=119.80&cod=CL330-2, Mar. 22, 2005.

International Search Report dated Jun. 14, 2005.

* cited by examiner

FIG. 17

INTERACTIVE EXERCISE DEVICE AND SYSTEM

BACKGROUND OF THE INVENTION

1. Field of the Invention

The present invention relates to an interactive exercise device and system for measuring the performance of exercise activity of a user and for providing user-specified feedback messages to the user during the exercise activity upon achievement of corresponding user-specified goals.

2. Description of the Related Art

Conventional exercise measurement and monitoring devices, such as pedometers, typically measure a basic exercise performance indicator and then display that indicator to the user along with some other calculated performance parameters. For example, in the case of a typical pedometer, the exercise device is worn by the user and measures the number of steps performed by the user by using a motion measuring mechanism such as an accelerometer or other known type of motion measuring device. Such a pedometer also typically includes a small display of some sort, such as an LED or LCD display, for displaying the measured number of performed steps. In some cases, a typical pedometer may also display a limited number of other performance parameters, such as distance walked, time walked, calories expended, and other related parameters, which are calculated by a small processor in the pedometer.

A pedometer as described above provides a limited ability for the user to interact with the pedometer to display a desired performance parameter. For example, a typical pedometer may provide a button, which allows the user to change the displayed performance parameter to the next performance parameter in accordance with a predetermined parameter display sequence set in the pedometer. The use of these pedometers is often frustrating to the user because the user cannot go directly to a desired parameter but must instead proceed through the predetermined display sequence to get to a display of the desired parameter. Also, some known types of pedometers provide a limited ability for the user to input physical attributes associated with the user. For example, such a known type of pedometer may allow the user to input the user's weight, stride length and other such personal data by using a button in association with a displayed parameter field. However, in the few devices that have such features, the user may become frustrated because the user must know how to access the particular displayed parameter field in order to enter the desired physical attribute, such as weight.

Known types of pedometers may also provide an indication, such as a sound or a displayed signal that is triggered when the user achieves a predetermined value for a corresponding performance parameter, such as a beep when the user achieves 5,000 steps walked or 250 calories expended. However, these triggered indications are typically predetermined by the manufacturer of the pedometer and are not adjustable by the user. Accordingly, such achievement-triggered indications are often meaningless to the user because they do not correspond to the user's exercise routine or physical condition. For example, the user may want to take several short walks during the day and therefore desires a triggered achievement indication when 2000 steps are achieved for each short walk.

Although some known pedometers provide a limited ability for a user to set a triggered notification corresponding to achievement of a certain value of a performance parameter, such notifications are limited and are difficult to setup through the fixed display sequence and button sequences described above. Even these types of triggered notifications are limited to a selection by the user from a limited number of notifications provided by the pedometer, such as a predetermined set of audible beeps or a predetermined set of display messages.

Personally tailored feedback during an exercise routine is important to a user because it can provide the user with an indication of the user's progress in relation to that user's personal exercise routine, and because it can provide motivation that is meaningful to the user to continue progressing through the routine to reach the user's personal exercise goals. The aforementioned known types of notification messages are very limited in their effectiveness because they do not provide personalized indications of the user's progress in relation to the user's personal exercise routine, and because they do not provide personalized motivational messages that are meaningful to the user.

Another shortcoming with known types of exercise measuring and monitor devices is that they provide limited functionality that is specific to a particular task but do not provide other functions that are often useful to a user during exercise and during various types of exercise. For example, a user may want to monitor the user's heart rate while walking, or may want to use a clock or an alarm while walking, in addition to monitoring the performance parameters typically associated with a pedometer. In addition, the user may want to perform other types of exercise such as bicycling or using a stationary exercise machine, and be able to monitor performance parameters associated with those types of exercise using the same device.

Accordingly, it is desirable to develop an exercise measuring and monitoring device that allows the user to easily set user-specified exercise goals that are tracked by the device during exercise activity, and that allows the user to easily setup user-specified personalized notification messages that are displayed by the device upon achievement of the corresponding user-specified goals. In addition, it is desirable to develop an exercise measuring and monitoring device that has an easily readable display screen and that allows the user to directly navigate to a desired display without having to proceed through a predetermined set of all possible displays. The desired device also preferably supports multiple functionality to provide the user with desired functionality during more than one type of exercise.

SUMMARY OF THE INVENTION

The present invention addresses the foregoing need by providing a multifunction exercise measuring and monitoring device that has an easily-navigated menu-driven display for monitoring performance parameters and for inputting data, that allows the user to easily download user-specified exercise goals that are tracked by the device during exercise activity and user-specified personalized notification messages which are displayed by the device upon achievement of the corresponding user-specified goals. In addition, the device of the present invention supports multiple functions to provide the user with desired functionality during more than one type of exercise.

In one embodiment, the invention is directed to an interactive exercise device for measuring and displaying exercise performance parameters, the interactive exercise device including a step measuring device that outputs a step signal corresponding to each step walked by a user, a processor for determining a plurality of exercise performance parameters based on the step signals output from the step measuring device, a memory for storing the determined exercise performance parameters, a menu-driven interface display for displaying a plurality of menus, the menus for displaying at least the determined exercise performance parameters, a user input device for operation by the user to select a display of one of the menus on the interface display and to provide input data corresponding to a selected display, and an interface connection for connecting the interactive exercise device to an external computing device. The interface connection supports an upload of the determined exercise performance parameters from the interactive exercise device to the external computing device, and supports a download of user-specified data from the external computing device to the interactive exercise device, the user-specified data including at least one user-specified message that is displayed on the interface display when a user-selected one of the determined exercise performance parameters reaches a user-specified threshold.

In another embodiment, the invention is directed to an interactive exercise system for measuring and displaying exercise performance parameters, in which the interactive exercise system includes an external computing device having a local processor, a local memory, a local display monitor, an interface connection port and a local network connection port, and a server having a server processor, a server memory and a server network connection port, the server being connected to the external computing device by a network connection connected to the server network connection port and to the local network connection port of the external computing device. The server sends display pages to the external computing device for display on the local display monitor and the server also receives data from the external computing device. The system also includes an interactive exercise device which has a step measuring device that outputs a step signal corresponding to each step walked by a user, a processor for determining a plurality of exercise performance parameters based on the step signals output from the step measuring device, a memory for storing the determined exercise performance parameters, a menu-driven interface display for displaying a plurality of menus, the menus for displaying at least the determined exercise performance parameters, a user input device for operation by the user to select a display of one of the menus on the interface display and to provide input data corresponding to a selected display, and an interface connection that connects the interactive exercise device to the interface connection port of the external computing device through a data connection. User-specified data is downloaded from the external computing device to the interactive exercise device through the data connection, the user-specified data including at least one user-specified message that is displayed on the interface display of the interactive exercise device when a user-selected one of the determined exercise performance parameters reaches a user-specified threshold. Furthermore, exercise performance parameters are uploaded from the interactive exercise device to the external computing device through the data connection, and are then uploaded from the external computing device to the server through the network connection between the server and the external computing device.

In yet another embodiment, the invention is directed to an interactive exercise system for measuring and displaying exercise performance parameters, the interactive exercise system including a server having a server processor, a server memory, and a server network connection port. The system also includes an interactive exercise device that has a step measuring device that outputs a step signal corresponding to each step walked by a user, a processor for determining a plurality of exercise performance parameters based on the step signals output from the step measuring device, a memory for storing the determined exercise performance parameters, a menu-driven interface display for displaying a plurality of menus, the menus for displaying at least the determined exercise performance parameters, a user input device for operation by the user to select a display of one of the menus on the interface display and to provide input data corresponding to a selected display, and a wireless interface connection that connects the interactive exercise device directly to the server, wherein the server sends user-specified data to the interactive exercise device and the server receives determined exercise performance parameters from the interactive exercise device. The user-specified data includes at least one user-specified message that is displayed on the interface display of the interactive exercise device when a user-selected one of the determined exercise performance parameters reaches a user-specified threshold.

In other specific embodiments, the interactive exercise device is implemented in a clamshell-shape that has a detachable and replaceable faceplate on the outside with a latch to secure the hinged lid to the main body. The interactive exercise device also has a USB connection port that supports a connection to an external computer so that the interactive exercise device is recognized as a mass storage device by the external computer. The interface display is a backlit liquid crystal display of the type currently used in mobile telephones, and the device also has a radio frequency receiver for receiving heart rate data from an external heart monitor that can then be displayed by the device. The device also has a connection for receiving bicycle exercise measurement data that is converted to performance data that can be displayed by the device. The plurality of menus include top-level menus representing functions for reviewing previous day's performance parameters, for setting up timed events, for selecting device options, and for inputting user settings, such as personal physical data. Each top level has corresponding sub-menus for easy navigation and input of data by the user through the use of corresponding buttons. In addition, the interactive exercise device can function as a clock and an alarm, and automatically resets performance data at the end of each day after saving that day's data into memory. The user preferably uses a webpage displayed on the external computer that is provided from the server for inputting text-based user-specified messages and their corresponding performance parameter thresholds that are downloaded to the interactive exercise device so that each user-specified message is displayed when the user achieves the corresponding performance parameter threshold during an exercise session. In other embodiments, the interactive exercise device is connected directly to the server via a wireless connection port in the interactive exercise device. In such direct wireless embodiments, the server sends user-specified data directly to the interactive exercise device and the server receives determined exercise performance parameters directly from the interactive exercise device, via the wireless connection between the interactive exercise device and the server.

In this manner, the present invention provides a compact interactive exercise device that provides multifunction exercise measuring and monitoring, that has an easily-navigated menu-driven display for monitoring performance parameters and for inputting data, that allows the user to easily download user-specified exercise goals that are tracked by the device during exercise activity and user-specified personalized notification messages which displayed upon achievement of the corresponding user-specified goals.

Other and further objects and advantages of the present invention will be further understood and appreciated by those skilled in the art by reference to the following specification, claims, and drawings.

BRIEF DESCRIPTION OF THE DRAWINGS

FIG. 17 is a graphic depicting a web page that displays the user's exercise performance parameters that have been measured and determined by the interactive exercise device and uploaded to a server according to one embodiment of the present invention.

DETAILED DESCRIPTION OF THE INVENTION

As mentioned above, the present invention is generally directed to a multifunction exercise measuring and monitoring device that has an easily-navigated menu-driven display for monitoring performance parameters and for inputting data, that allows the user to easily download user-specified exercise goals and user-specified personalized notification messages which are displayed by the device upon achievement of the corresponding user-specified goals.

Figure 1:
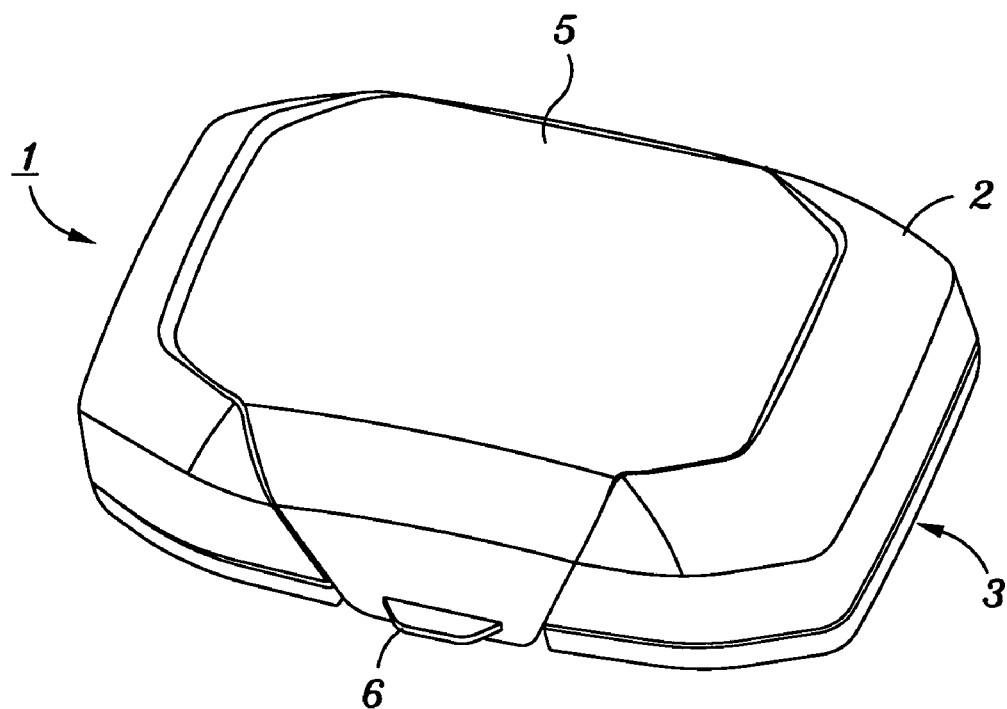
FIG. 1 is a perspective view of a first side of the interactive exercise device according to one embodiment of the present invention.

Turning to the figures, FIG. 1 shows a perspective view of a first side of the interactive exercise device according to one embodiment of the present invention. As seen in FIG. 1, the outer case of interactive exercise device 1 of the present invention is shown. In this regard, the primary functional components of interactive exercise device 1 shown in FIG. 1 are housed in main body 2. Hinged lid 3 is attached to main body 2 by a simple hinge which allows hinged lid 3 to open away from main body 2 to allow a user to access interactive exercise device 1 during use, and which allows hinged body 3 to close against main body 2 to form a compact case that protects the components of interactive exercise device 1 from damage. Main body 2 is seen to have detachable faceplate 5 that is removably attached to its outside surface. This allows the user to customize the look of interactive exercise device 1 by having several detachable faceplates having different colors, patterns or styles on the outside surface. In this regard, detachable faceplate 5 is attached to main body 2 by tabs on detachable faceplate 5 that fit into slots or grooves on main body 2, or by snaps, or other known readily detachable fasteners. Detachable faceplate 5 includes latch 6 that is used to temporarily fasten hinged lid 3 to main body 2 by having a groove on the underside of latch 6 pressed over a notch in the outer edge of hinged lid 3. Of course, other types of latches can be used to temporarily and detachably fasten hinged lid 3 to main body 2, thereby allowing the user to close the outer case of interactive exercise device 1 in a clamshell shape. Main body 2, hinged lid 3 and detachable faceplate 5 can be made of a durable plastic, metal or other suitable material.

Figure 2:
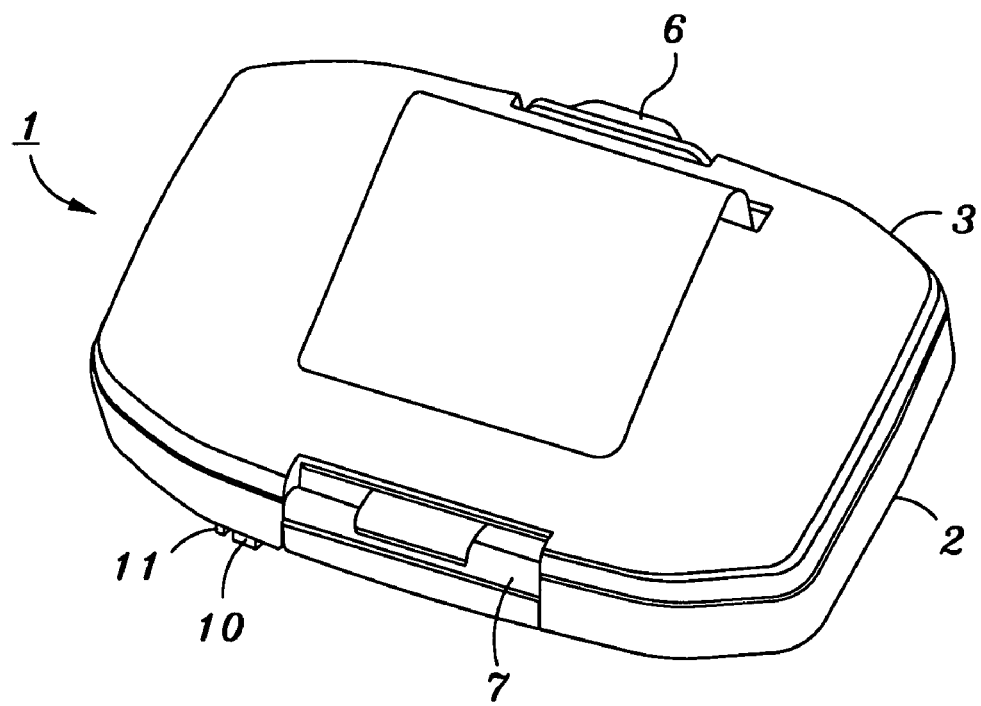
FIG. 2 is a perspective view of a second side of the interactive exercise device according to one embodiment of the present invention.
Figure 3:
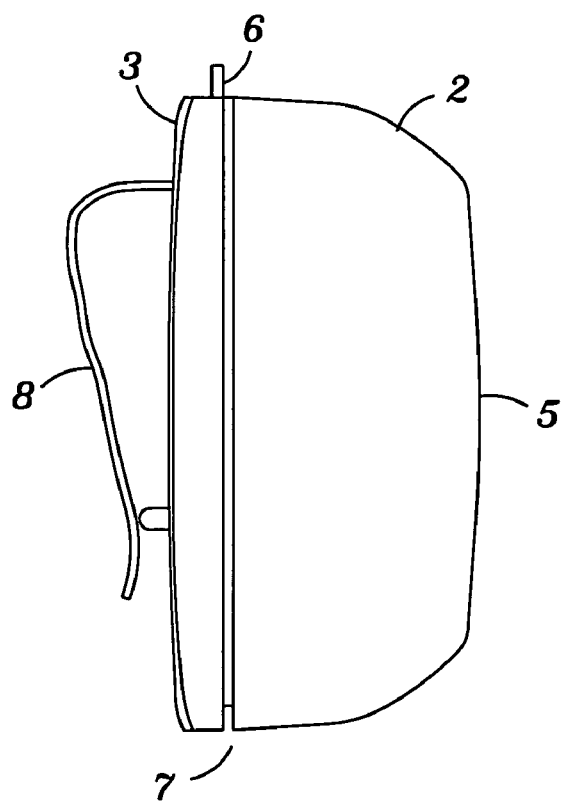
FIG. 3 is a side view of the interactive exercise device according to one embodiment of the present invention.

FIG. 2 shows a perspective view of a second side of the outer case of interactive exercise device 1, from which hinged lid 3 can be more plainly seen, and FIG. 3 shows a side view of the outer case. In these views, it can be seen that hinged lid 3 is attached to main body 2 by hinge 7. Hinge 7 is seen to be made from two separate mating hinge components that are each integrally formed in main body 2 and in hinged lid 3, respectively. Of course, other types of hinges, connectors or fasteners can be used to connect hinged lid 3 to main body 2 in a pivotal manner. Also seen in FIGS. 2 and 3 is clip 8 which is connected to hinged lid 3 and which is used to clip interactive exercise device 1 to a user's belt, waistband, or other item so that interactive exercise device 1 can be worn by the user during an exercise session. Clip 8 can be metal, plastic, or other durable material, and preferably has some flexibility to allow it to bend while being attached to the user. In this regard, clip 8 can also be formed as an integral portion of hinged lid 3.

Also shown in FIG. 2 are universal serial bus (USB) port 10 and bike data port 11. USB connection port 10 allows the user to connect interactive exercise device 1 to an external computing device such as a personal computer or a personal device assistant (PDA) via a USB connection cable, thereby allowing the user to upload data from, and download data to, interactive exercise device 1. Bike data port 11 allows the user to connect interactive exercise device 1 to an external bicycle exercise monitor to receive bicycle exercise data such as revolutions per minute and the like. Accordingly, interactive exercise device 1 can be used as a pedometer or as a bicycle exercise monitor while the user is exercising on a bicycle which is either stationary or moving. Bike data port 11 can be a serial port or can be another known type of port, which supports the transfer of data signals, whether digital or analog. The functionality of interactive exercise device 1 that is associated with the use of USB port 10 and bike data port 11 is discussed in detail further herein.

Figure 4:
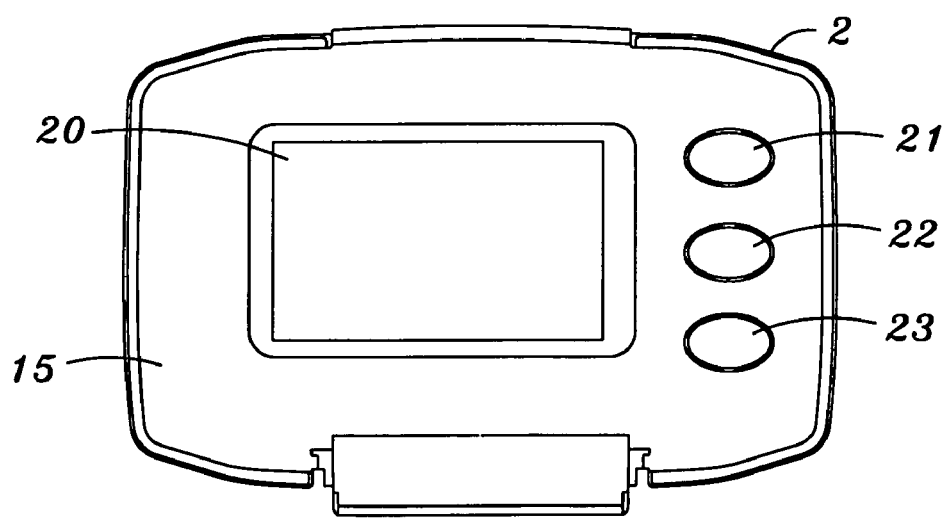
FIG. 4 is a view of the menu-drive interface display and input buttons of the interactive exercise device according to one embodiment of the present invention.

Turning to FIG. 4, inside surface 15 of main body 2 is shown, and is seen to house display 20 and input buttons 21 to 23. Display 20, as shown in FIG. 4, is a liquid crystal (LCD) display having a sufficient resolution to clearly display text and other graphic symbols, and may be of a high resolution to support the display of pictures and photographs. In this regard, display 20 shown is FIG. 4 is a type of LCD display currently used in mobile telephones and other portable devices. Input buttons 21 to 23 are a typical type of press button, which outputs a discrete signal when pressed by a user. Although only three buttons are shown in FIG. 4, other numbers of buttons may be used to implement the present invention. Display 20 is used to display any one of a large number of menus that collectively allow the user to view exercise performance parameters and data, and to use input buttons 21 to 23 to input data representing the user's personal settings and also the user's desired option settings for interactive exercise device 1. The set of menus displayed by display 20 and their associated functionality in correspondence with input buttons 21 to 23 is discussed in further detail below.

The menus displayed by display 20, in correspondence with the use of input buttons 21 to 23, easily allow the user of interactive exercise device 1 to navigate directly to a desired menu without having to cycle through the entire set of menus, which is a disadvantage of conventional exercise monitoring devices. FIGS. 5A to 5G show examples of menus displayed by display 20 of interactive exercise device 1 associated with the exercise activity of walking, by which interactive exercise device 1 functions as a pedometer. More specifically, FIGS. 5A to 5G are sub-menus associated with the top-level function of a step event, which is a session of walking exercise by the user. As seen in FIGS. 5A to 5G, bottom left field 33 of display 20 is used to indicate the top-level function of interactive exercise device 1 currently engaged in by the user. Similarly, top left field 31 of display 20 is used to indicate the type of sub-menu currently being displayed which represents a sub-function of the top-level function currently engaged in by the user. Central field 32 of display 20 is a data filed which is used to display text, data, graphics or even a picture that is associated with the current sub-function of the sub-menu. Button command fields 34 to 36 are located adjacent to input buttons 21 to 23 and are used to display an input or command that each one of input buttons 21 to 23 is currently functioning as. In this manner, display 20 readily provides information to the user to indicate which top-level function and which sub-function the menu represents, and also provides button commands for the user to easily navigate to a desired menu and to input a desired setting or option.

Figure 5A:
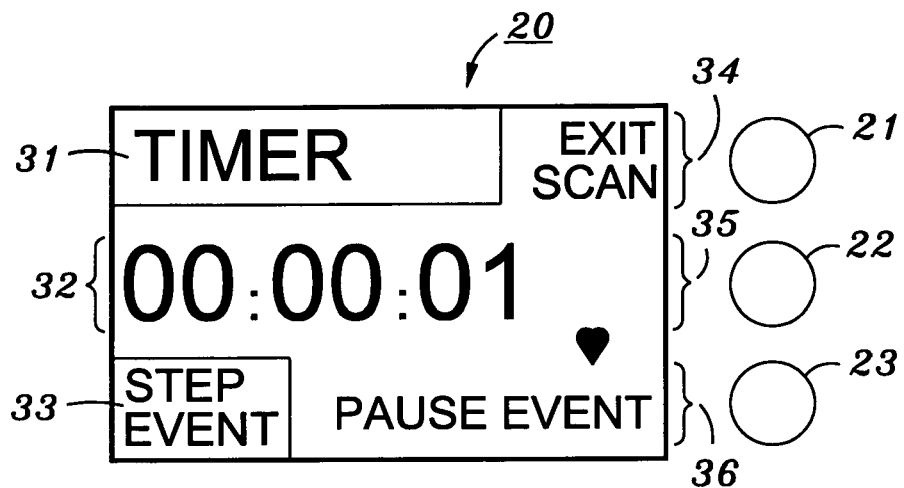
FIGS. 5A to 5G are graphic depictions of representative menus for display on the menu-drive interface display according to one embodiment of the present invention.

In the menu displayed by display 20 in FIG. 5A, bottom left field 33 indicates that interactive exercise device 1 is currently engaged in a "Step Event" top-level function by the user, and top left field 31 indicates that the menu is a "Timer" sub-menu representing a timer sub-function currently engaged in for the "Step Event" top-level function. Central field 32 shows timer data depicting the elapsed time of the current step event. Button command field 34 indicates that top input button 21 currently functions to "Exit" the currently displayed menu to "Scan" all sub-menus associated with the "Step Event" top-level function. Button command field 35 is empty and therefore indicates that middle input button 22 does not currently perform a function in this sub-menu. Button command field 36 indicates that lower input button 23 currently functions to "Pause" the current step event.

Figure 5B:
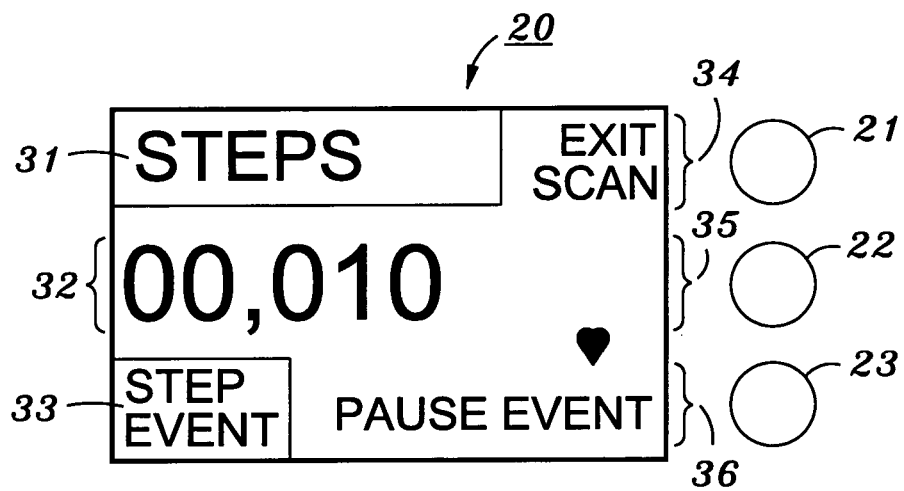

Similarly, in the menu displayed by display 20 in FIG. 5B, bottom left field 33 indicates that interactive exercise device 1 is currently engaged in a "Step Event" top-level function by the user, and top left field 31 indicates that the menu is a "Steps" sub-menu representing a step count sub-function currently displayed for the "Step Event" top-level function. Central field 32 shows step count data depicting the number of steps for the current step event. Button command field 34 indicates that top input button 21 currently functions to "Exit" the currently displayed menu to "Scan" all sub-menus associated with the "Step Event" top-level function. Button command field 35 is empty and therefore indicates that middle input button 22 does not currently perform a function in this sub-menu. Button command field 36 indicates that lower input button 23 currently functions to "Pause" the current step event.

Figure 5C:
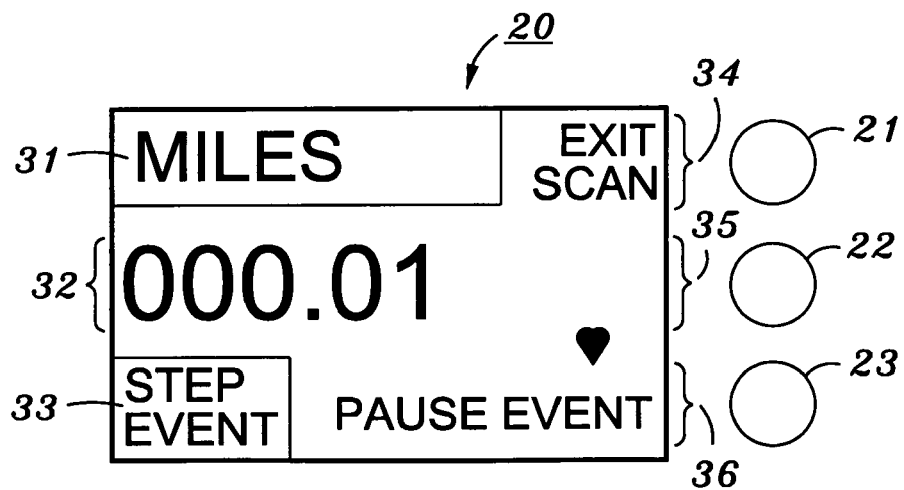

In FIG. 5C, bottom left field 33 of display 20 indicates that interactive exercise device 1 is currently engaged in a "Step Event" top-level function by the user, and top left field 31 indicates that the menu is a "Miles" sub-menu representing a mileage measurement sub-function for the "Step Event" top-level function. Central field 32 shows current total mileage for the current step event. Button command field 34 indicates that top input button 21 currently functions to "Exit" the currently displayed menu to "Scan" all sub-menus associated with the "Step Event" top-level function. Button command field 35 is empty and therefore indicates that middle input button 22 does not currently perform a function in this sub-menu. Button command field 36 indicates that lower input button 23 currently functions to "Pause" the current step event.

Figure 5D:
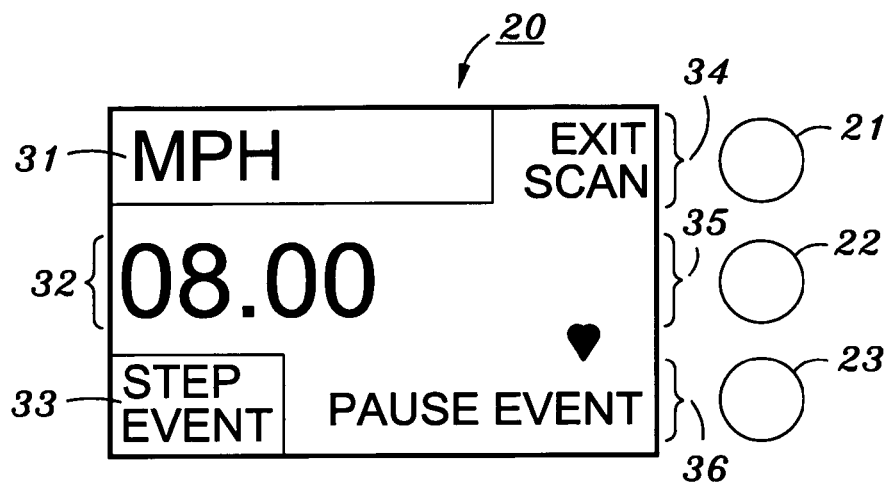

Turning to FIG. 5D, bottom left field 33 of display 20 indicates that interactive exercise device 1 is currently engaged in a "Step Event" top-level function by the user, and top left field 31 indicates that the menu is an "MPH" sub-menu representing a speed measurement sub-function for the "Step Event" top-level function. Central field 32 shows the current speeding miles per hour for the current step event. Button command field 34 indicates that top input button 21 currently functions to "Exit" the currently displayed menu to "Scan" all sub-menus associated with the "Step Event" top-level function. Button command field 35 is empty and therefore indicates that middle input button 22 does not currently perform a function in this sub-menu. Button command field 36 indicates that lower input button 23 currently functions to "Pause" the current step event.

Figure 5E:
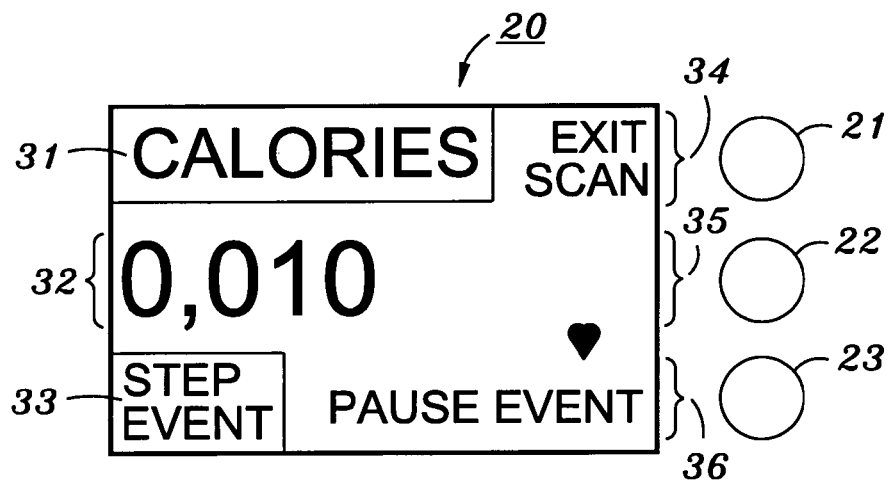

In FIG. 5E, bottom left field 33 of display 20 indicates that interactive exercise device 1 is currently engaged in a "Step Event" top-level function by the user, and top left field 31 indicates that the menu is a "Calories" sub-menu representing a calorie measurement sub-function for the "Step Event" top-level function. Central field 32 shows current total calories expended by the user for the current step event. Button command field 34 indicates that top input button 21 currently functions to "Exit" the currently displayed menu to "Scan" all sub-menus associated with the "Step Event" top-level function. Button command field 35 is empty and therefore indicates that middle input button 22 does not currently perform a function in this sub-menu. Button command field 36 indicates that lower input button 23 currently functions to "Pause" the current step event.

Figure 5F:
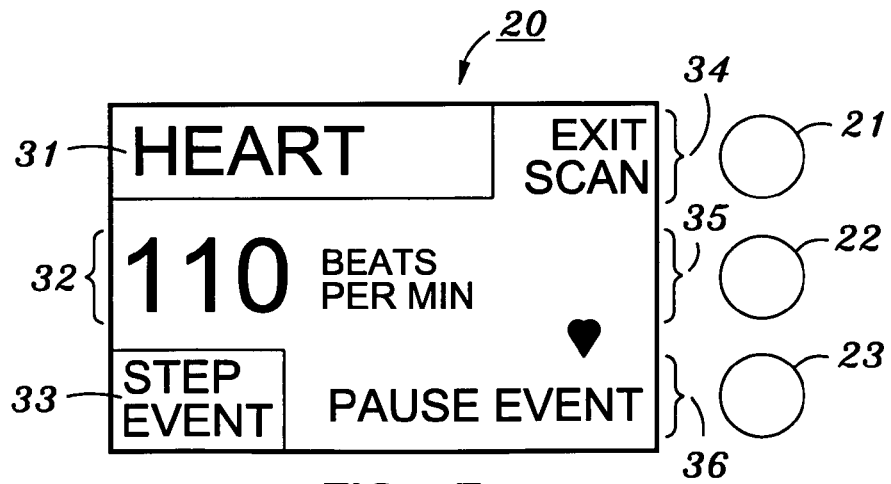

In FIG. 5F, bottom left field 33 of display 20 indicates that interactive exercise device 1 is currently engaged in a "Step Event" top-level function by the user, and top left field 31 indicates that the menu is a "Heart" sub-menu representing a heart rate monitor sub-function for the "Step Event" top-level function. In this sub-function, the heart rate is obtained from a signal received by a heart rate radio frequency receiver in interactive exercise device 1, where the signal is transmitted from an external heart rate monitor. This functionality is discussed in more detail herein. Central field 32 shows the user's current heart rate in beats per minute for the current step event. Button command field 34 indicates that top input button 21 currently functions to "Exit" the currently displayed menu to "Scan" all sub-menus associated with the "Step Event" top-level function. Button command field 35 is empty and therefore indicates that middle input button 22 does not currently perform a function in this sub-menu. Button command field 36 indicates that lower input button 23 currently functions to "Pause" the current step event.

Figure 5G:
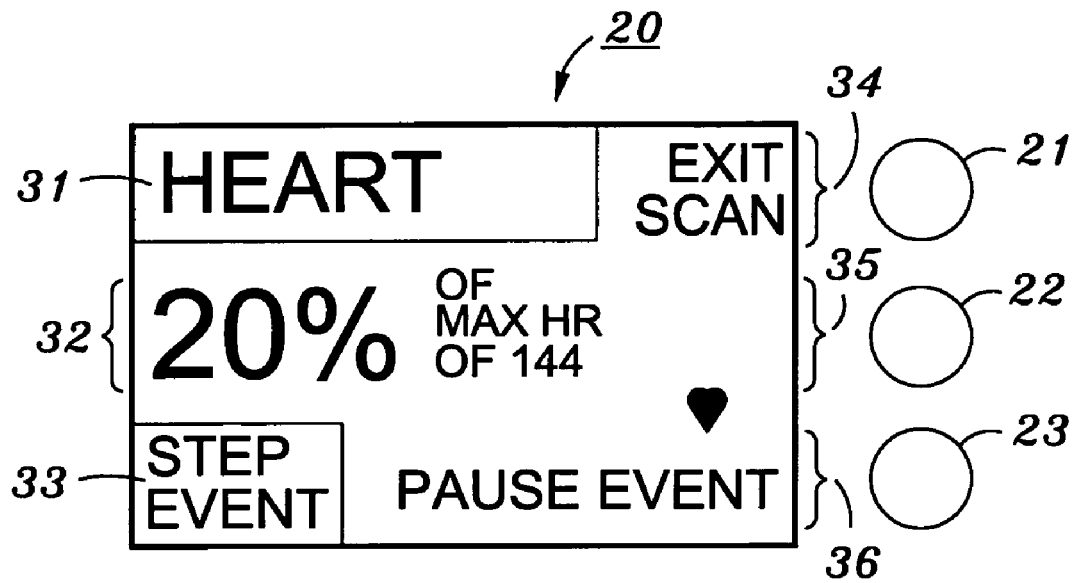

FIG. 5G is the same sub-menu as that of FIG. 5F, except that the heart rate in central field 32 of FIG. 5G is shown as a percentage of a predetermined maximum heart rate. Another sub-level menu (not shown) for the "Step Event" top-level function is the "Exit To Main Menu" and is accessed by pressing input button 21 while viewing any of the sub-menus shown in any of FIGS. 5A to 5G. The "Exit To Main Menu" then allows the user to navigate directly to the top-level menus.

Figure 6:
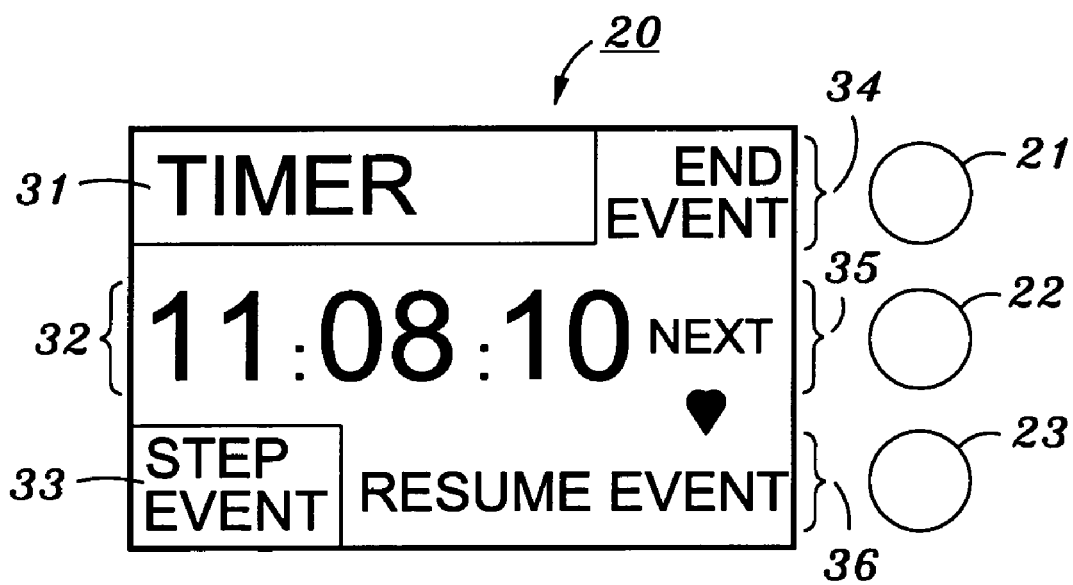
FIG. 6 is a graphic depiction of a representative menu for display on the menu-drive interface display showing an input command corresponding to each of the input buttons according to one embodiment of the present invention.

FIG. 6 represents the "Timer" sub-menu discussed above with respect to FIG. 5A, after the user has paused the current step event by pressing lower input button 23 in that sub-menu. Accordingly, the sub-menu displayed in FIG. 6 is the same as that in FIG. 5A, except that the timer data shown in central field 32 is static and depicts the elapsed time of the current step event up until the event was paused by the user. Also, button command field 34 is now changed to indicate that top input button 21 currently functions as "End Event" to end the current "Step Event" top-level function. Similarly, button command field 35 is now changed to indicate that middle input button 22 currently functions as "Next" to display the next sub-menu for the step event top-level function. Button command field 36 is also changed to indicate that lower input button 23 currently functions as "Resume Event" to resume the current step event.

Figure 7A:
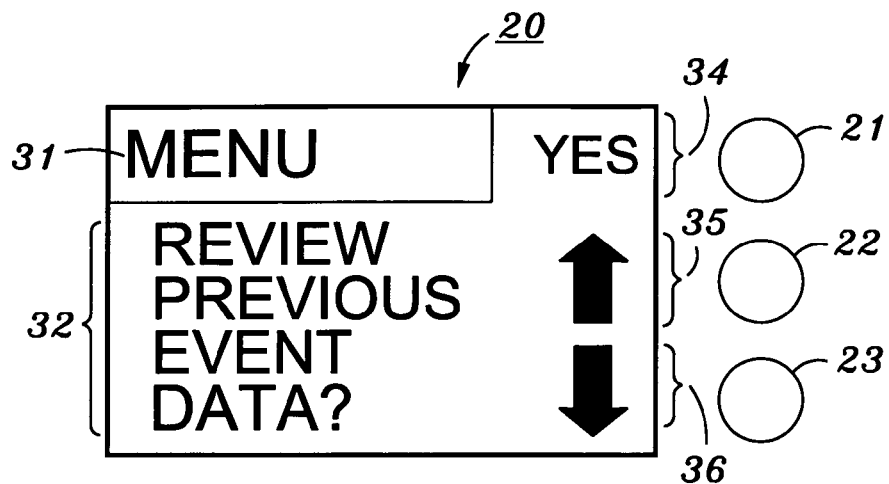
FIGS. 7A to 7F are graphic depictions of menus representing top-level functions performed by the interactive exercise device according to one embodiment of the present invention.

FIGS. 7A to 7F show the top-level menus for display on display 20 of interactive exercise device 1, from which the sub-menus corresponding to each particular top-level function, such as the step event top-level function discussed above, can be accessed. As seen in FIG. 7A, bottom left field 33 of display 20 is empty, thereby indicating that interactive exercise device 1 is not displaying a sub-menu, and left field 31 indicates that this is a top-level "Menu" representing a the top-level menu page of a top-level function. Central field 32 shows the text corresponding to the current top-level function and is in the form of a question to ask the user if the user wants to access the sub-menus associated with this top-level function, which, in this case, is to "Review Previous Event Data" which is stored in memory from a previous event. Button command field 34 indicates that top input button 21 currently functions to answer "Yes" and access the sub-menus for the top-level function. Button command field 35 is an up arrow which indicates that middle input button 22 functions to display the next top-level menu, and button command field 36 is a down arrow which indicates that lower input button 23 functions to display the previous level menu. In this manner, the user can scroll through the top-level menus without having to access or display all of the sub-menus associated with each top-level menu.

Figure 7B:
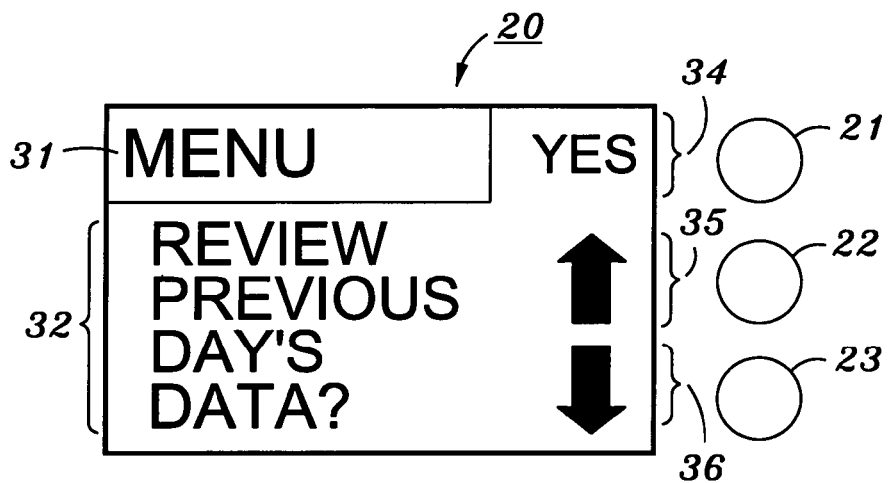
Figure 7C:
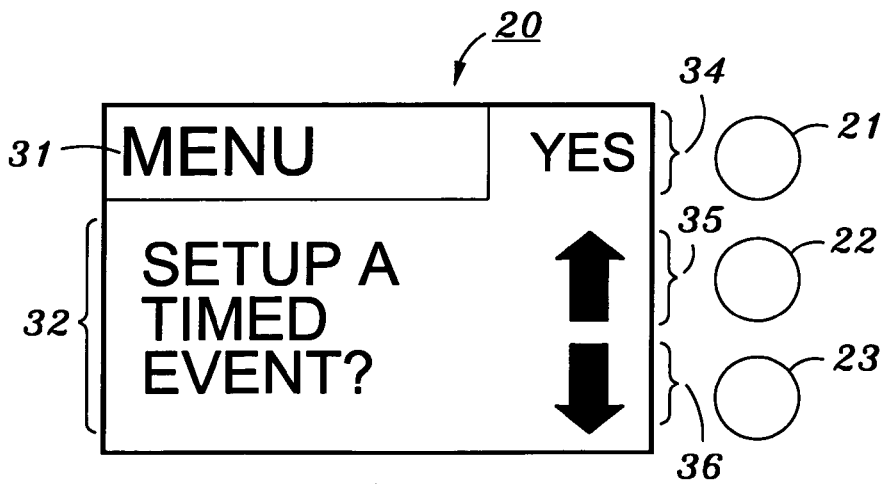
Figure 7D:
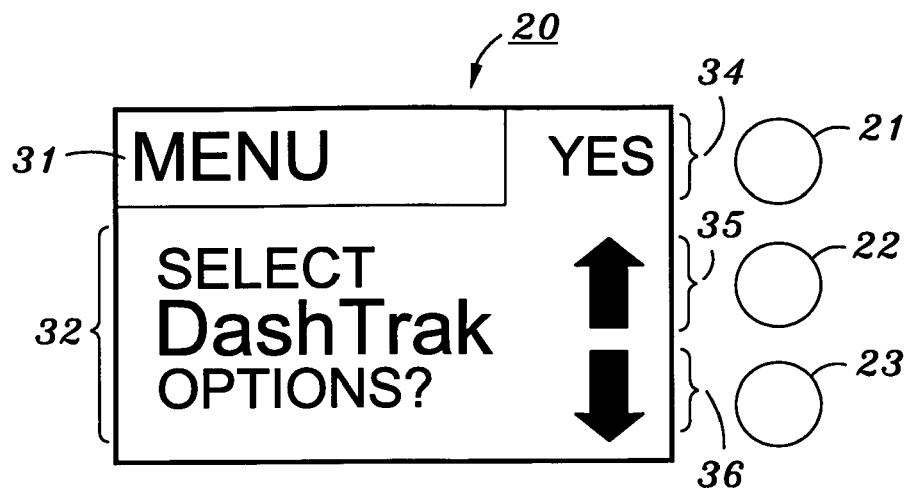
Figure 7E:
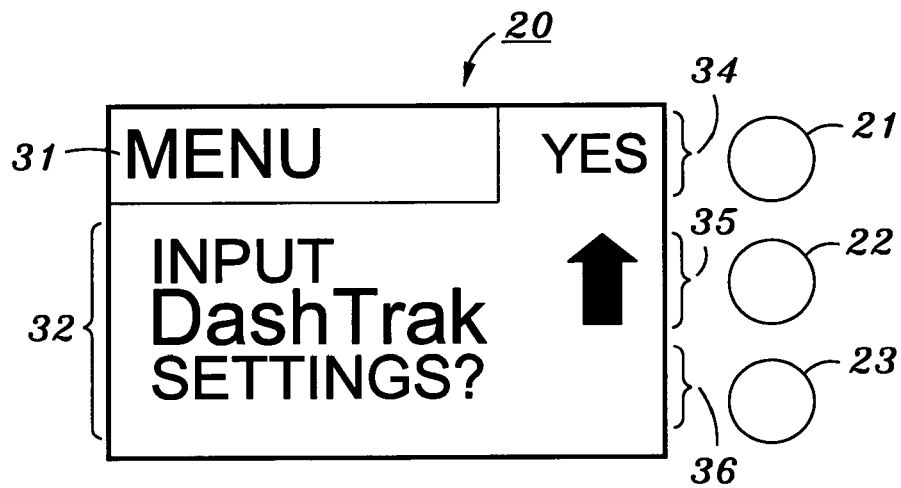
Figure 7F:
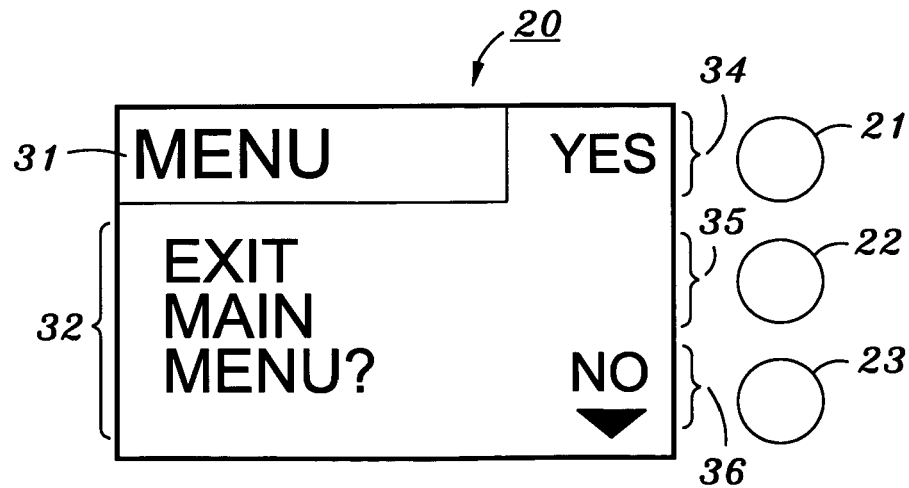

FIG. 7B is another top-level menu displayed on display 20 which is the same as that shown in FIG. 7A except that the text displayed in central field 32 corresponding to the current top-level function asks whether the user wants to access sub-menus associated with the top-level function to "Review Previous Day's Data". FIG. 7C is also a similar top-level menu except that the text displayed in central field 32 corresponding to the current top-level function asks whether the user wants to access sub-menus associated with the top-level function to "Setup A Timed Event". The top-level display of FIG. 7D is also similar except that the text displayed in central field 32 corresponding to the current top-level function asks whether the user wants to access sub-menus associated with the top-level function to "Select DashTrak Options". In FIG. 7E, the top-level display is similar except that the text displayed in central field 32 corresponding to the current top-level function asks whether the user wants to access sub-menus associated with the top-level function to "Input DashTrak Settings", and button command field 36 does not display a down arrow because this menu is at the end of the list of top-level menus. FIG. 7F shows a top-level menu which is at the other end of the list of top-level menus and is accessed by the user pressing middle input button 22 associated with the displayed up arrow in FIG. 7A. The text displayed in central field 32 corresponding to the current top-level function in FIG. 7F asks whether the user wants to "Exit Main Menu" in order to leave the list of top-level menus.

Figure 8:
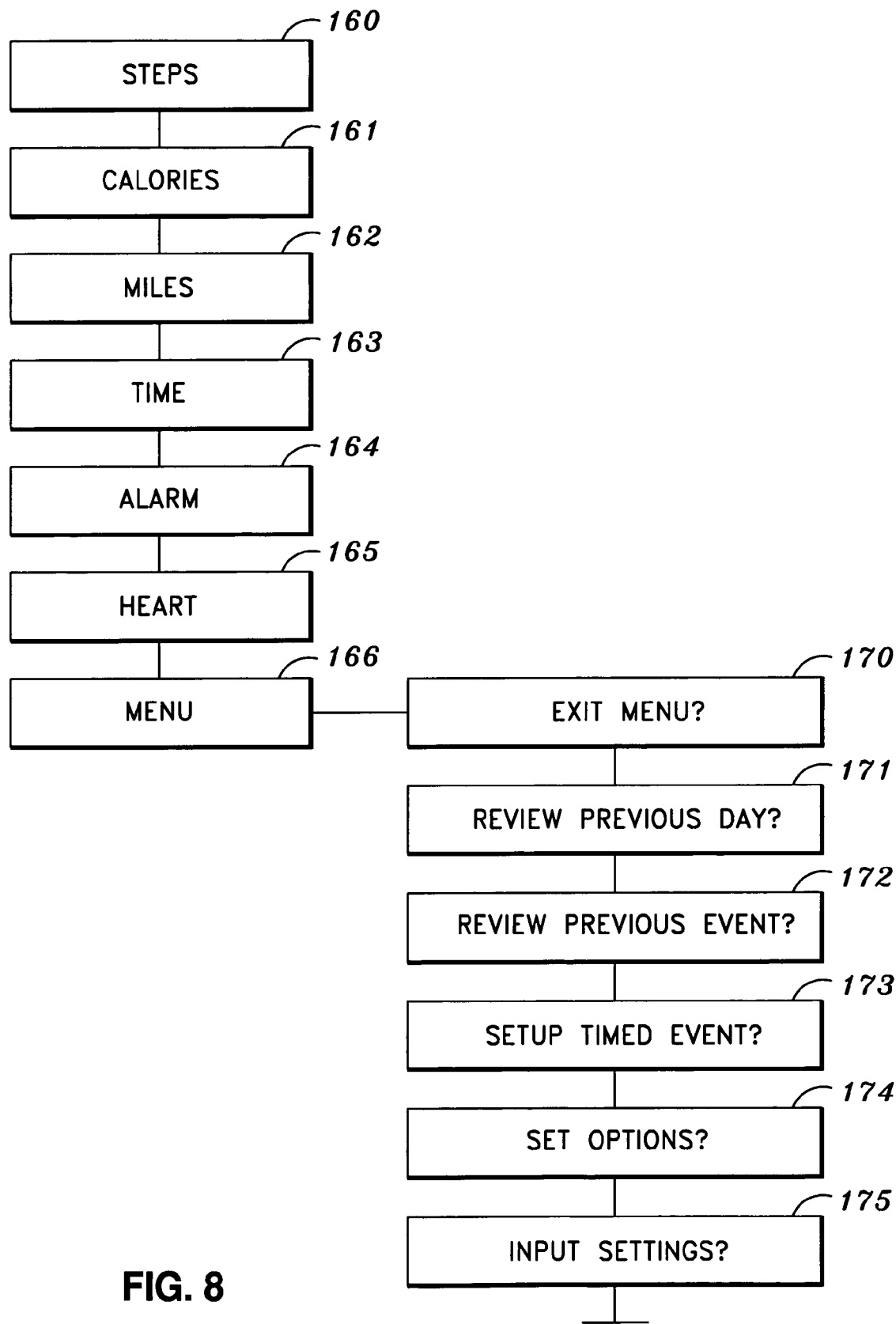
FIG. 8 is a graph showing a hierarchical representation of top-level menus according to one embodiment of the present invention.
Figure 9:
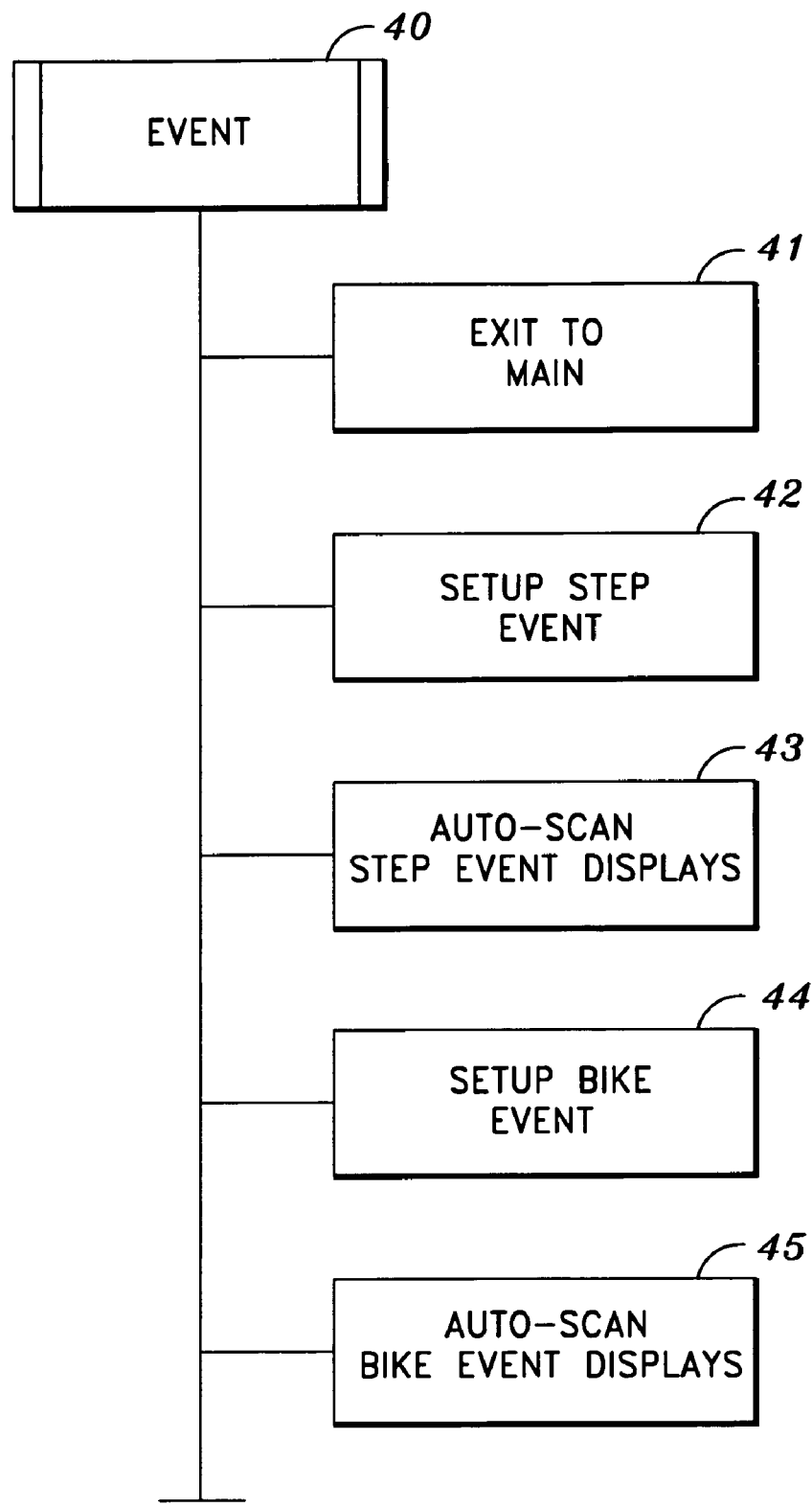
FIG. 9 is a graph showing a hierarchical representation of the sub-level menus corresponding to an exercise event function performed by the interactive exercise device according to one embodiment of the present invention.
Figure 10:
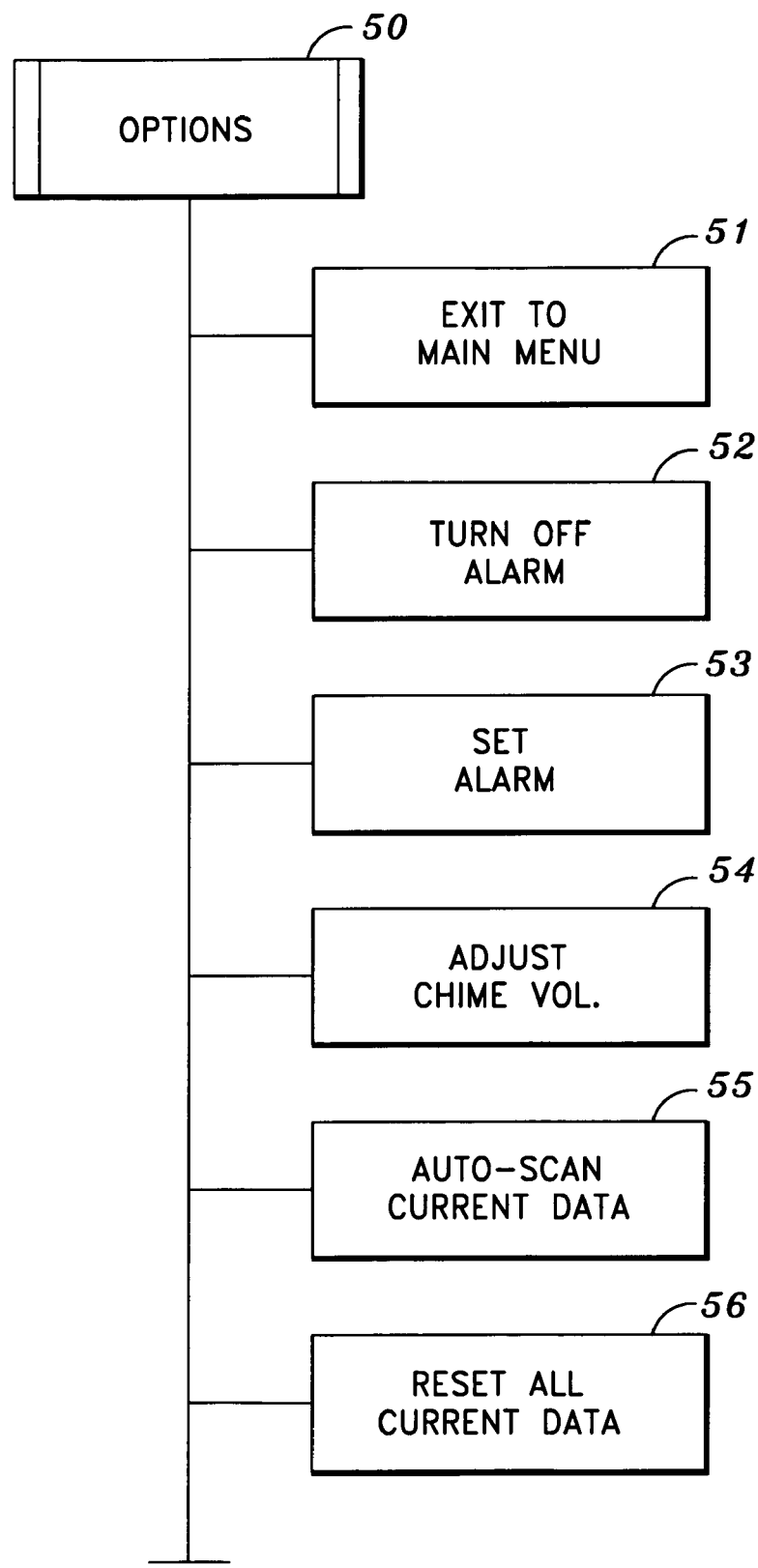
FIG. 10 is a graph showing a hierarchical representation of the sub-level menus corresponding to an options function performed by the interactive exercise device according to one embodiment of the present invention.

For the sake of brevity, FIGS. 8 to 10 depict hierarchical tree structures which represent the submenus associated with each top-level menu discussed above with regard to FIGS. 7C, 7D and 7E. The submenus associated with the top-level menus discussed above with regard to FIGS. 7A and 7B are not further described herein because they are the same as the submenus discussed above with regard to FIGS. 5A to 5G, except that they display only static data that is retrieved from memory to "Review Previous Event Data" or "Review Previous Day's Data".

FIG. 8 shows a hierarchy of top-level displays for display on interactive exercise device 1. As seen in FIG. 8, the left side of the hierarchy represents top-level displays for displaying exercise performance parameters, and the right side represents sub-level entry menus. Among the performance parameter displays are steps display 160 to display counted steps, calories display 161 for displaying determined calories expended, miles display 162 for displaying determined miles, time display 163 for displaying the current clock time, alarm display 164 for displaying the alarm function, heart display 165 for displaying measured heart rate, and main menu 166 from which the user can access the sub-level entry menus on the right side of FIG. 8. Among the sub-level entry menus are exit menu 170 to return to the display menus on the left side, review previous day menu which allows the user to review performance data from the previous day, such as steps, calories, and distance. Review previous event menu 172 allows the user to review performance data from a previous event, such as event duration time, steps, distance, speed, calories and heart rate. Setup timed event menu 173 allows a user to setup a timed event, as described in further detail below with respect to FIG. 9. Set options menu 174 allows a user to set device options into interactive exercise device 1, as described in further detail below with respect to FIG. 10. Input settings menu 175 allows a user to input personal attribute settings into interactive exercise device 1, as described in further detail below with respect to FIG. 11.

Turning to FIG. 9, top-level menu "Event" 40 represents the top-level menu described above with regard to FIG. 7C to "Setup A Timed Event". As seen in FIG. 9, the submenus associated with setting up a timed event include "Exit To Main" 41, "Setup Step Event" 42, "Autoscan Step Event Displays" 43, "Setup Bike Event" 44, and "Autoscan Bike Event Displays" 45. Briefly, "Exit To Main" submenu 41 allows the user to exit from these submenus back to the top-level "Setup A Timed Event" menu; "Setup Step Event" submenu 42 allows the user to setup a step event for the interactive exercise device 1 to perform during the user's walking session; and "Autoscan Step Event Displays" submenu 43 allows the user to automatically view each of the step event displays, such as those discussed above with regard to FIGS. 5A to 5G, to view performance parameters determined by interactive exercise device 1 for the current step event. Similarly, "Setup Bike Event" submenu 44 allows the user to setup a bike event for the interactive exercise device 1 to perform during a bicycle session by the user by connecting an external bicycle monitor to bike data port 11; and "Autoscan Bike Event Displays" submenu 45 allows the user to automatically view each of the bike event displays, similar to those discussed above with regard to FIGS. 5A to 5G, to view performance parameters determined by interactive exercise device 1 for the current bike event.

Turning to FIG. 10, top-level menu "Options" 50 represents the top-level menu described above with regard to FIG. 7D to "Setup DashTrak Options". As seen in FIG. 10, the submenus associated with setting up options for interactive exercise device 1 include "Exit To Main Menu" 51, "Turn Off Alarm" 52, "Set Alarm" 53, "Adjust Chime Volume" 54, "Auto Scan Current Data" 55; and "Reset All Current Data" 56. "Exit To Main Menu" submenu 51 allows the user to exit from these submenus back to the top-level "Setup DashTrak Options" menu; "Turn Off Alarm" submenu 52 and "Set Alarm" submenu 53 allow the user to set, and turn-off an alarm time; "Adjust Chime Volume" submenu 54 allows the user to set the desired chime volume for the alarm; "Auto Scan Current Data" submenu 55 allows the user to view each of the data settings of interactive exercise device 1; and "Reset All Current Data" submenu 56 allows the user to reset all of the data settings of interactive exercise device 1 to a predetermined value.

Figure 11:
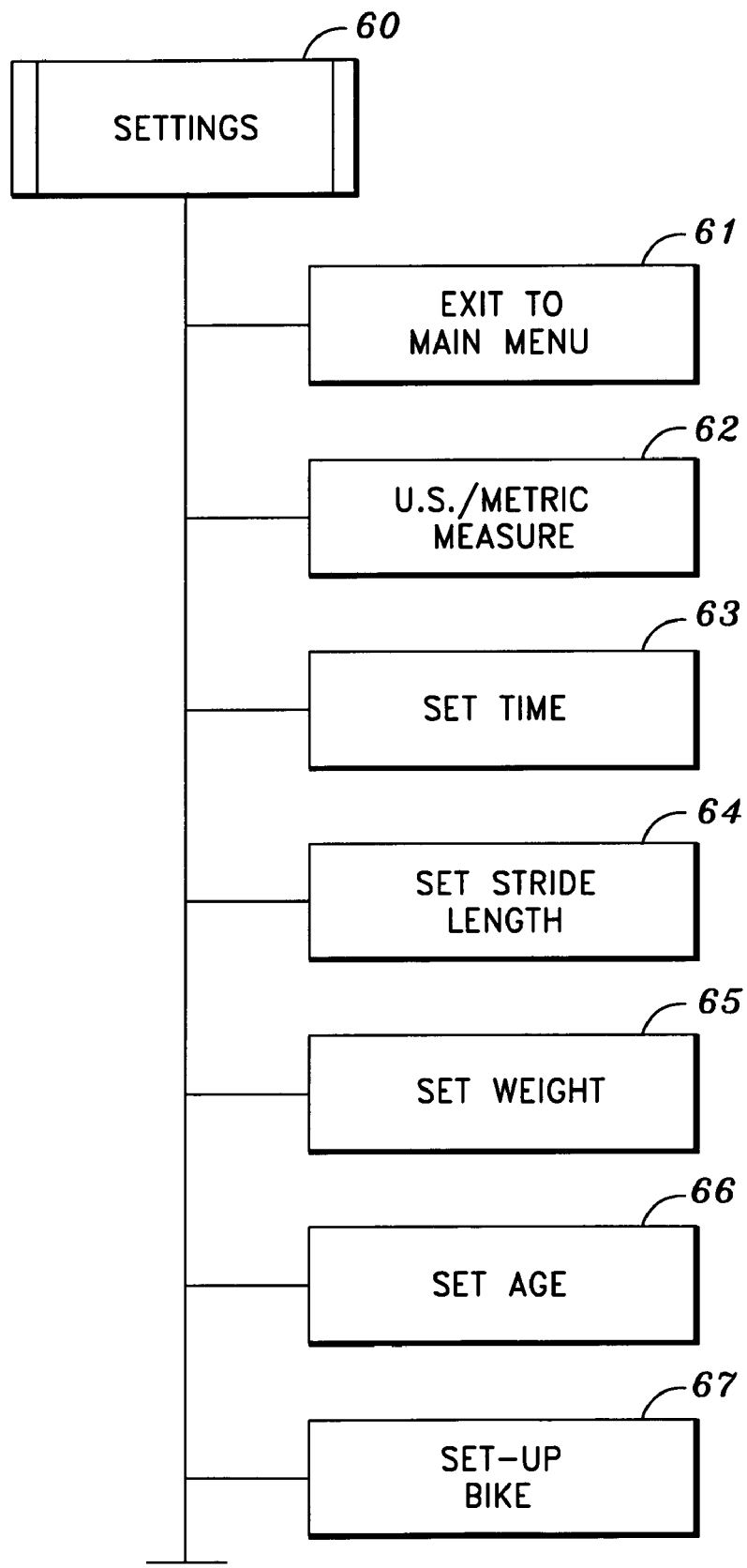
FIG. 11 is a graph showing a hierarchical representation of the sub-level menus corresponding to a user settings function performed by the interactive exercise device according to one embodiment of the present invention.

In FIG. 11, top-level menu "Settings" 60 represents the top-level menu described above with regard to FIG. 7E to "Input DashTrak Settings". As seen in FIG. 11, the submenus associated with inputting exercise parameter settings into interactive exercise device 1 include "Exit To Main Menu" 61, "U.S. or Metric Measurement" 62, "Set Time" 63, "Set Stride Length" 64, "Set Weight" 65, "Set Age" 66, and "Setup Bike" 67. "Exit To Main Menu" submenu 61 allows the user to exit from these submenus back to the top-level "Input DashTrak Settings" menu; "U.S. or Metric Measurement" submenu 62 allows the user to instruct interactive exercise device 1 to display exercise performance parameters using either the U.S. measurement system or the metric measurement system; "Set Time" submenu 63 allows the user to set the current time in interactive exercise device 1; "Set Stride Length" submenu 64 allows the user to input the user's stride length for use by interactive exercise device 1 in determining performance parameters associated with a step event performed by the user; "Set Weight" submenu 65 and "Set Age" submenu 66 allow the user to input the user's age and weight which are also used by interactive exercise device 1 in determining performance parameters associated with an exercise event performed by the user; and "Setup Bike" submenu 67 allows the user to input physical characteristics of a bicycle, such as wheel circumference, that the user will exercise on in order for interactive exercise device 1 to determine performance parameters associated with a bike event performed by the user.

Figure 12:
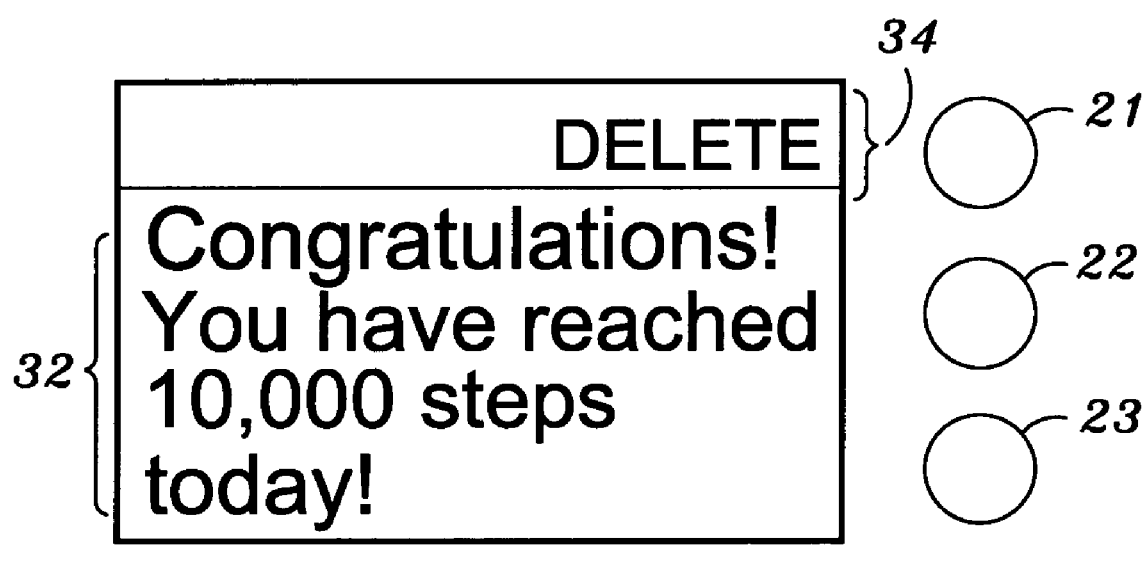
FIG. 12 is a graphic depicting a personalized user-specified achievement notification message according to one embodiment of the present invention.

FIG. 12 is an example of a display in which a user-specified goal achievement message is shown. As mentioned above, interactive exercise device 1 of the present invention allows a user to connect to an external computing device via USB port 10 and then download user-specified goals and corresponding user-specified personalized notification messages. Once downloaded to interactive exercise device 1, when a user-specified goal is reached, such as 10,000 steps walked during the day, the corresponding user-specified notification message is displayed. In the display shown in FIG. 12, central field 32 of display 20 contains the user-specified text notification message that congratulates the user for reaching the user-specified goal of 10,000 steps. Upper right field 34 includes the text "Delete" which allows the user to delete the user-specified message by pressing input button 21. The manner in which the user sets a user-specified goal and a user-specified personalized goal notification message and then downloads them from an external computer to interactive exercise device 1 is discussed in more detail below.

Figure 13:
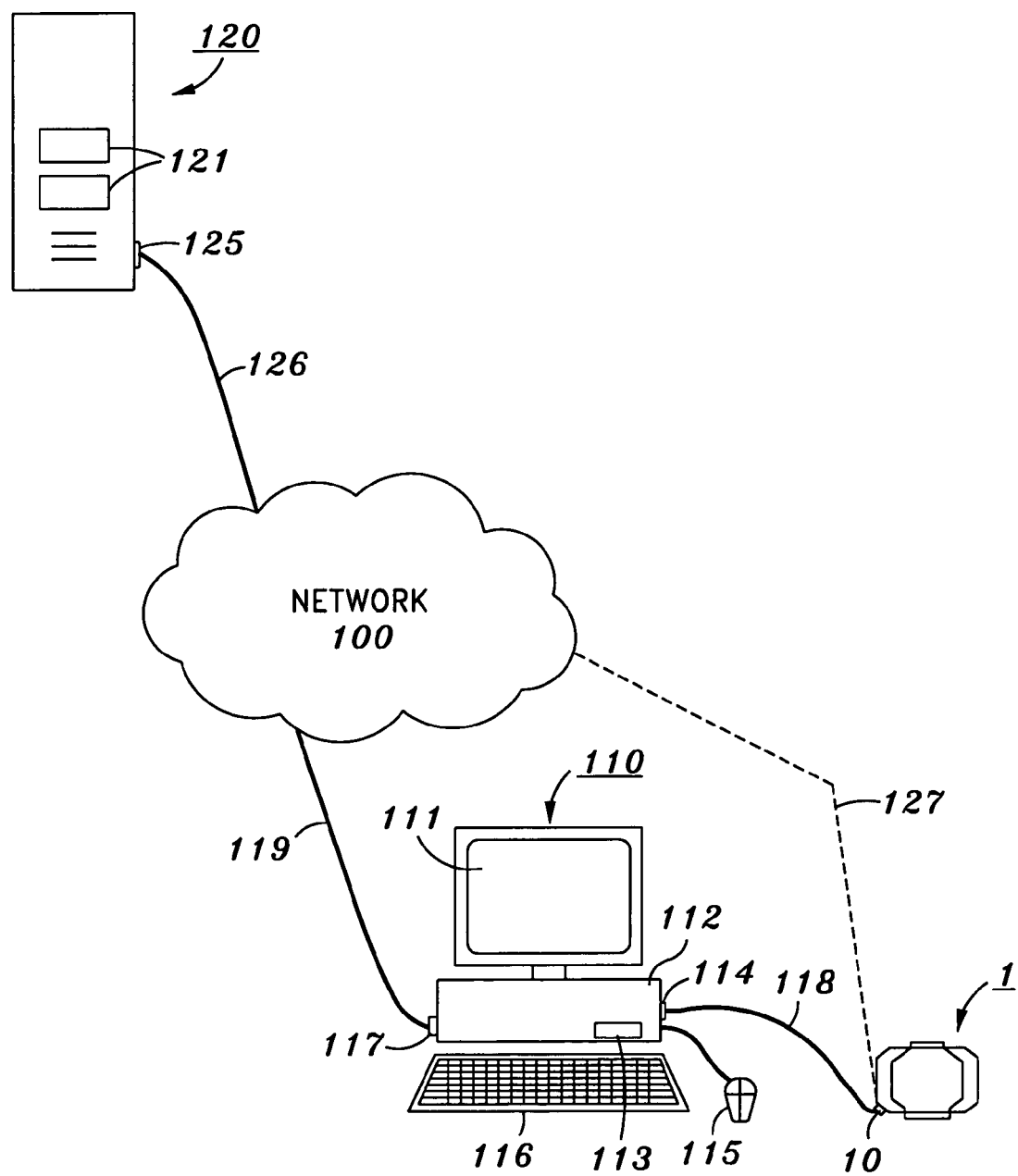
FIG. 13 is a schematic depiction of a networked system for using the interactive exercise device according to one embodiment of the present invention.

In this regard, FIG. 13 is a system level schematic depicting a system in which the current invention may be practiced. As seen in FIG. 13, interactive exercise device 1 is connected to external computer 110 through USB port 10 of interactive exercise device 1. External computer 110 is seen to be a typical personal computer and includes the typical components, including a display monitor 111, central processing unit 112 including a memory such as hard drive 113, mouse 115 and keyboard 116. Local USB port 114 is used to connect to interactive exercise device 1 via USB cable 118 and network port 117 is used to connect to network 100 through network connection 119. In this regard, port 114 can instead be a wireless connection port and port 10 of interactive exercise device 1 can be a wireless connection port so that connection 118 is a wireless connection for connecting external computer 110 to interactive exercise device 1. The wireless connection 118 may be of any known type of wireless connection, such as Bluetooth, infrared, etc. External computer 110 may execute a windowing operating system, or other type of operating system, and also executes a web browser to access and display web pages from the internet on display monitor 111. Network 100 is preferably the internet, but may be a LAN or WAN.

Also seen in FIG. 13, is server 120, which is a typical network-ready server, and has a memory such as hard drives 121, and a network port 125 for supporting network connection 126 to network 120. In the system shown in FIG. 13, the user of interactive exercise device 1 can use a personal computer such as computer 110 to interface with interactive exercise device 1 in order to upload data from interactive exercise device 1 to a database in server 120 for viewing in a web page on computer 110. Also, the user can use computer 110 to input settings, options and user-specified goals and personalized notification messages through a web page from server 120, and then download the input settings, options and user-specified goals and personalized notification messages to interactive exercise device 1 through USB connection 118. These functions are described in more detail below. Computer 110 may be in the user's home or workplace, or may be any personal computer located anywhere as long as the computer has network access to the internet in order to connect to server 120. In this regard, it should be appreciated that the invention works equally well if network connections 119 and/or 126 are wireless network connections. Also, it should be appreciated that computer 110 may instead be a personal device assistant (PDA) or other computing device that has a network connection and a USB connection for connecting to interactive exercise device 1. In another alternative, port 10 of interactive exercise device 1 may be a wireless connection port instead of a USB port, wherein wireless connection port 10 is used to connect directly to server 120 via network 100 through wireless connection 127, without the need to go through computer 110. For example, interactive exercise device 1 may automatically connect to server 120 at predetermined time intervals by using wireless connection 127 in order to upload determined exercise parameters to server 120 and to download any physical attribute data and message data. Wireless connection 127 may be a cellular wireless connection, a wireless WAN connection, or another known type of wireless connection.

Figure 14:
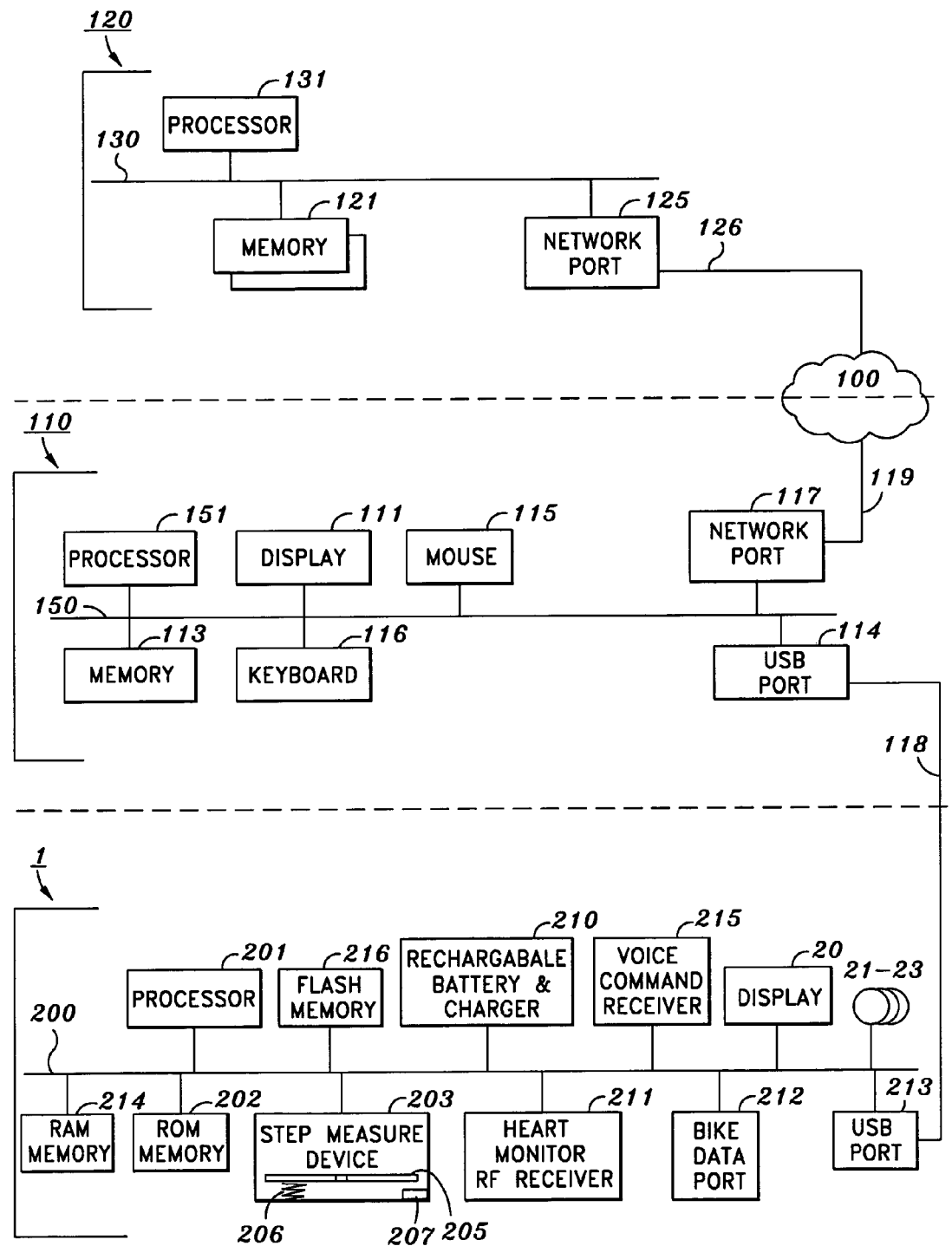
FIG. 14 is a schematic depiction of the internal components of an interactive exercise device, an external computing device, and a server of the system shown in FIG. 13.

Turning to FIG. 14, key components of the internal architecture for server 120, computer 110 and interactive exercise device 1 are shown. Server 120 is seen to have typical components such as internal data bus 130, processor 131, memory hard drives 121 and network port 125. Processor 131 is a typical known type of processor that can execute an operating system and operates server 120 for hosting a web site for access via the internet. Memory hard drives 121 may be typical hard drives used in internet servers, and must be large enough to store a large number of web pages and a large database for storing exercise performance data, settings, options, goals and messages associated with each one of a large number of users. Network port 125 is used to connect to internet 100 via network connection 126, which may be a physical connection or a wireless connection. In this manner, server 120 acts as a trusted web site host and is accessible to any user of interactive exercise device 1 to upload and store the user information from interactive exercise device 1 to a database in server 120, or for assisting in the input and download of settings, options, user-specified goals and user-specified notification messages to interactive exercise device 1.

Also shown in FIG. 14 is the internal architecture of external computer 110 disposed in central processing unit 112, which is seen to have typical computer components such as internal data bus 150 connected to which are processor 151, memory hard drive 113, display 111, keyboard 116, mouse 115, network port 117 and USB port 114. Processor 151 is a typical known type of processor that can execute an operating system, such as a windowing operating system, and memory hard drives 113 is a typical hard drives used in personal computers. Network port 117 is used to connect computer 110 to network 100 through network connection 119 which may be a hardwire or a wireless network connection. USB port 114 is used to connect computer 110 to USB port 213 of interactive exercise device 1 through USB connection 118.

The internal architecture of interactive exercise device 1 is also shown in FIG. 14, and is seen to include internal data bus 200, connected to which is processor 201, ROM-type memory 202, step measuring device 203, rechargeable battery 210, heart rate monitor radio frequency receiver 211, display 20, bike data port 212, input buttons 21 to 23, and USB port 213. Also connected to bus 200 is RAM-type memory 214, flash-type memory 216 and voice command receiver 215. Processor 201 is a known type of processor and may be a limited or reduced instruction set processor or a typical computer processor capable of executing a conventional operating system. ROM-type memory 202 is a typical read-only memory for use in small computing device, such as EPROM, or the like, and is used to store executable program code and fixed data. Flash memory 216 is a known type of writeable memory for storing dynamic device data, and may instead be a small disk drive, smartcard, or other type of writeable memory. RAM-type memory 214 is a typical runtime memory for use by processor 201 to temporarily hold segments of executable code and data.

Step measuring device 203 is used to support the pedometer functions of interactive exercise device 1, such as a step event. In this regard, step-measuring device 203 is preferably a highly accurate measurer of steps walked by the user while interactive exercise device 1 is attached to or carried by the user. Step measuring device 203 as shown in FIG. 13 is seen to be a balanced-lever type of device which outputs a discrete signal each time one end of lever 205 is moved toward circuit contact 207. Balanced-lever 205 is held in tension by spring 206 so that a certain amount of motion created by each step of the user is required to move the end of lever 205 in contact with circuit contact 207. Preferably, the tension applied by spring 206 can be adjusted by the user via an adjustment control that is accessible to the user on interactive exercise device 1. In this manner, the accuracy of step measuring system 203 can be even further refined in accordance with the walking style and physical characteristics of the user of interactive exercise device 1. Rechargeable battery 210 has a built-in charger so that it may be recharged by simply being connected to an external power source. In this regard, rechargeable battery 210 is connected to internal data bus 200 only to provide a signal of the current charge level of the battery, for display on display 20 and also for supporting a notification message if the battery charge crosses a low threshold. Rechargeable battery 210 provides power to the components of interactive exercise device 1 via other power connections not shown in FIG. 13.

Heart monitor radio frequency (RF) receiver 211 is a typical type of RF receiver and is used to receive an RF data signal from an external heart monitor worn by or connected to the user, where the external heart monitor has an RF transmitter. In this manner, interactive exercise device 1 can be used to monitor and record the user's heart rate during an exercise event, such as a step event or a bike event. Similarly, bike data port 212 is used to receive a bike performance data signal, such as revolutions per minute, from an external bicycle monitor that is disposed on or connected to a bicycle on which the user is performing a bike event. Bike data port may support a serial connection, or other type of data connection supported by external bicycle performance monitor devices.

Display 20 and input buttons 21 to 23 were discussed above and are used to display easily navigable menus to allow the user to view exercise performance parameters and to input settings and options into interactive exercise device 1. Similarly, voice command receiver 215 is used to receive voice commands from the user and to pass the commands in digital form to processor 201 during operation of interactive exercise device 1, in order to navigate display menus and input data. USB port 213 is used to connect interactive exercise device 1 to USB port 114 of computer 110 through USB connection 118. Accordingly, it can be appreciated that the system of the present invention shown in FIG. 14 allows the user to indirectly connect interactive exercise device 1 to a web site hosted by server 120 in order to upload exercise performance parameters to a database in server 120 so that the user may view event performance and performance trends through web pages provided by server 120. In addition, the indirect connection of interactive exercise device 1 to a web site hosted by server 120 enables the user to access web pages provided by server 120 which allows the user to input user-specific settings and options for interactive exercise device 1, and also user-specified goals and corresponding personalized goal achievement message, which are then downloaded to interactive exercise device 1 in order to customize its functionality and to provide personalized feedback messages to the user during exercise. In this manner, interactive exercise device 1 of the present invention provides the user with a more meaningful and rewarding exercise experience. Of course, the web site hosted by server 120 is a trusted website and maintains the user's data in confidence in the database in relation to the user's identity and account with the web site. As mentioned above, USB port 213 can instead be a wireless connection port which allows interactive exercise device 1 to connect directly with server 120 through the internet, without going through computer 110.

Figure 15:
FIG. 15 is a graphic depicting a web page, through which the user inputs user-specified messages, user-specific personal data, and device settings, to be downloaded to the interactive exercise device according to one embodiment of the present invention.

FIG. 15 shows a web page that is accessed from server 120 by a user through computer 110 when interactive exercise device 1 is connected to computer 110 as depicted in FIGS. 13 and 14, thereby enabling the user to input and download data to interactive exercise device 1. As seen in FIG. 15, settings web page 300 is accessed by selecting "settings" tab 301, and is seen to include three basic areas for the user to input data, "step goals and messages" section 302, "personal motivational messages" section 303, and "settings" section 304. "Step goals and messages" section 302 includes input fields in which the user can input a daily step count goal, which may be the same for each day of the week, or may vary from day to day. "Step goals and messages" section 302 also allows a user-specified goal achievement message to be entered for display on interactive exercise device 1 when a user-specified daily step count goal is reached.

"Personal motivational messages" section 303 allows the user to enter a unique personal motivational message corresponding to each one of an increasing sequence of step counts. In this manner, the user can receive a self-specified motivational message at each increasing level of total step count in order to provide continued motivation for continued exercise. Other options can also be set in section 303 to enable the user to turn the aforementioned notifications on or off, to adjust the volume of the chimes for the alarm function in the interactive exercise device 1, and to set the current time in the interactive exercise device 1.

"Settings" section 304 enables the user to switch the units of measurement of the data displayed in the interactive exercise device 1 between U.S. standards and metric standards. Personal information can also be entered in "settings" section 304 to allow the user to enter the user's weight, stride length, a bike wheel circumference, and clock settings such as time zone and daylight savings options. When the user has input the desired data in web page 300, the user selects "update" button 305, which then initiates the download of the input data in web page 300 from computer 110 to interactive exercise device 1 via USB port 213. In this regard, web page 300 contains necessary instructions to cause computer 110 to download input data to, and upload exercise performance parameters from, interactive exercise device 1. Accordingly, the trusted web site hosted by server 120 allows a user of interactive exercise device 1 to update the interactive exercise device 1 with user-specified settings, options and data from any computer with an internet connection.

Figure 16:
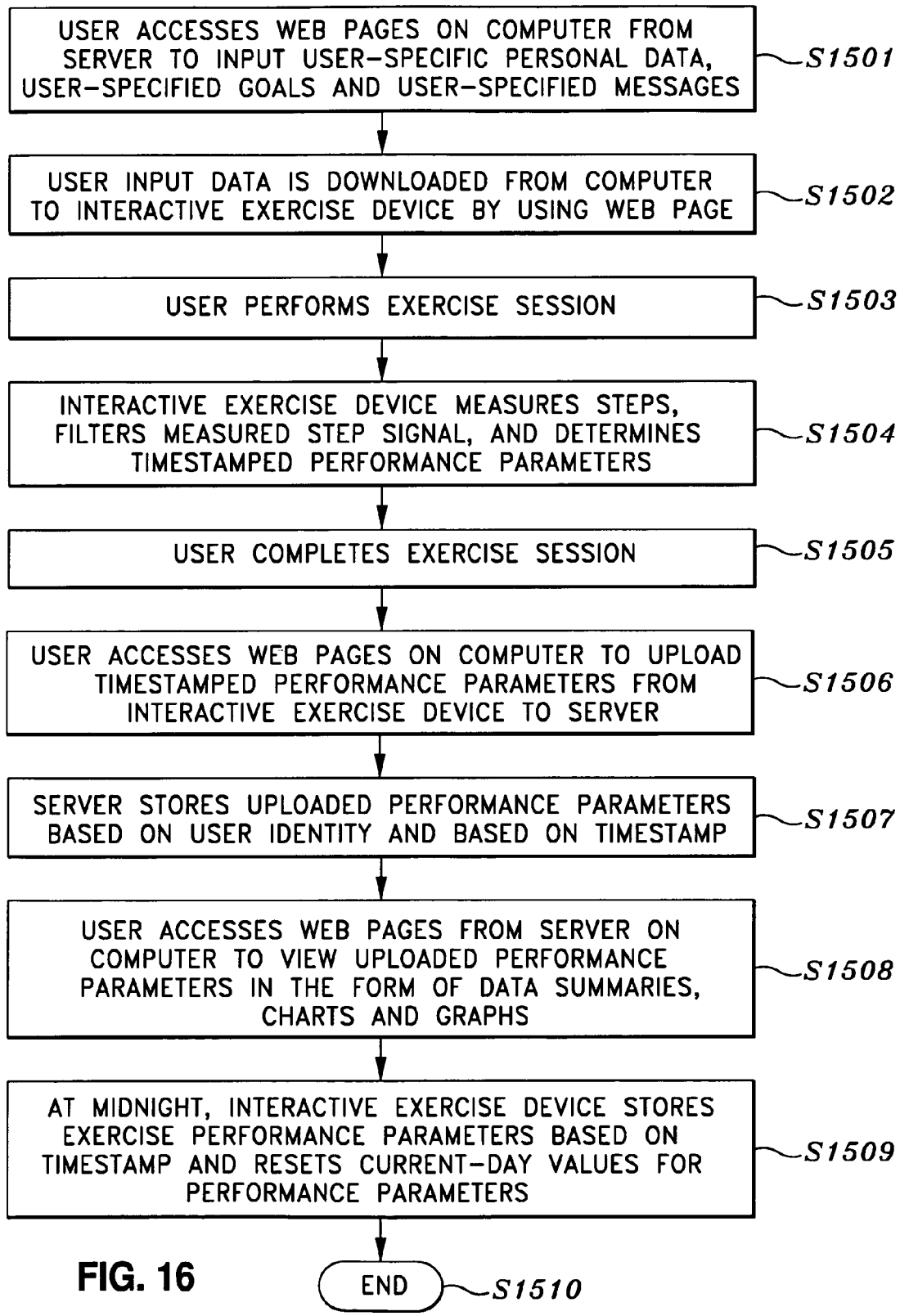
FIG. 16 is a flowchart showing the system-level steps for using the interactive exercise device according to one embodiment of the present invention.

FIG. 16 is a flowchart for describing the basic system level steps for using the interactive exercise device 1 as shown in FIGS. 13, 14 and 15. In step S1501 of FIG. 16, the user accesses one or more web pages, such as web page 300, from server 120 to input user-selected options, settings, personal data and personalized motivation messages. Next, in step S1502, the data input by the user in step S1501 is downloaded from computer 110 to interactive exercise device 1 by using the input web page. It should be noted that steps S1501 and S1502 are used only when the user wants to download input data or upload performance parameters, and that these steps do not have to be performed every time the user wants to use interactive exercise device 1. In step S1503, interactive exercise device 1, which is disconnected from computer 110, is used to begin an exercise session, such as a step event or a bike event. During the exercise session, interactive exercise device 1 measures and monitors the steps performed by the user through step measuring device 203 (or the wheel revolutions for a bike event are obtained by bike data port 212), the step signal is filtered according to a specified filtering program, and time-stamped exercise performance parameters are determined by processor 201 (step S1504). The user then completes the exercise session in step S1505.

Next, in step S1506, the user accesses a different web page from server 120 on computer 110, which uploads to server 120 the time-stamped exercise performance parameters that were determined by interactive exercise device 1 during the user's exercise session. The server then stores the uploaded exercise performance parameters in a confidential database in correspondence with the user's identity and in correspondence with the time-stamp of the uploaded data (step S1507). The data remains in the database and is later accessed by the user when the user identity, preferably through an account number, to the web site hosted by server 120. In this manner, the user can later access web pages from server 120 to view the uploaded exercise performance parameters in various forms, such as tabular, summaries, charts and graphs (step S1508). The present invention therefore provides an interactive exercise device 1 that dynamically interfaces indirectly with a web site to allow the user to update interactive exercise device 1 from any internet-ready computer, and then to later view that user's data from any internet-ready computer, which may not be the same as that used for updating interactive exercise device 1.

Lastly, interactive exercise device 1 automatically stores the current day's exercise performance parameters as the previous day's parameters, and then resets the current day's performance parameter values to predetermined values (step S1509). For example, the current day's step count, mileage, and the like are reset to zero. The flowchart then ends at step S1510.

Figure 17:
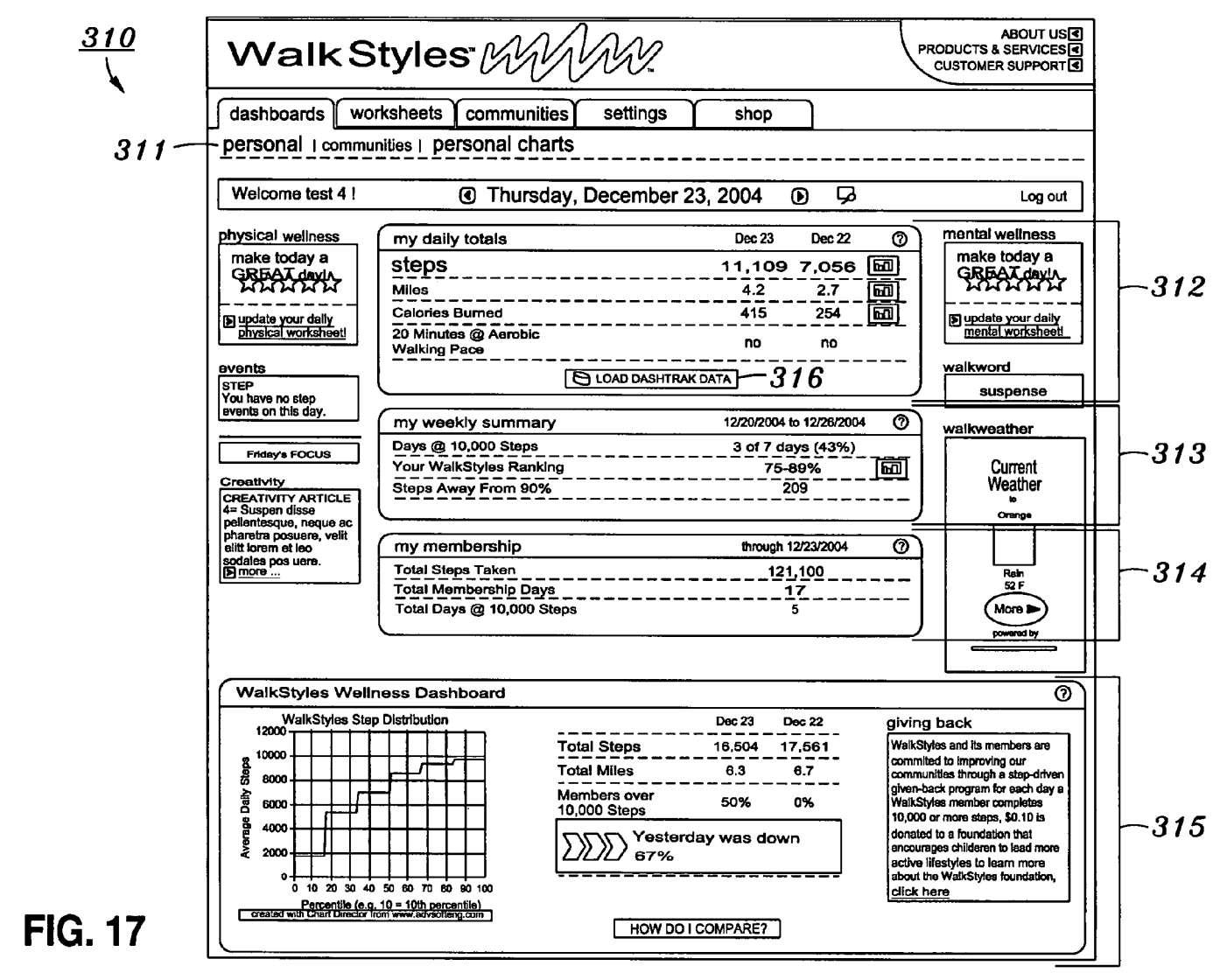

FIG. 17 is an example of a web page that a user accesses from server 120 via network 100 and views using computer 110. Web page 310 is shown in FIG. 17, and is used to display the user's exercise performance parameters that have been uploaded to server 120 as discussed above. Web page 310 is accessed by selecting "personal" tab 311, and is seen to include daily total section 312, weekly summary section 313, membership 314, and step distribution 315 section. Daily total section 312 displays the exercise parameters in tabular form for the current day and the previous day, and includes "load data" button 316 to enable the user to upload the exercise performance data from interactive exercise device 1 to server 120. Weekly summary section 313 provides a weekly summary of exercise performance parameters along with other statistical data based on the user's parameters. Membership section 314 provides a running total of the user's exercise performance parameters since the inception of the user's use of the web site on server 120 to upload data from the user's interactive exercise device 1. Lastly, step distribution section 315 shows a relation between the user's exercise performance parameters and those of all other members that user the web site of server 120.

Figure 18:
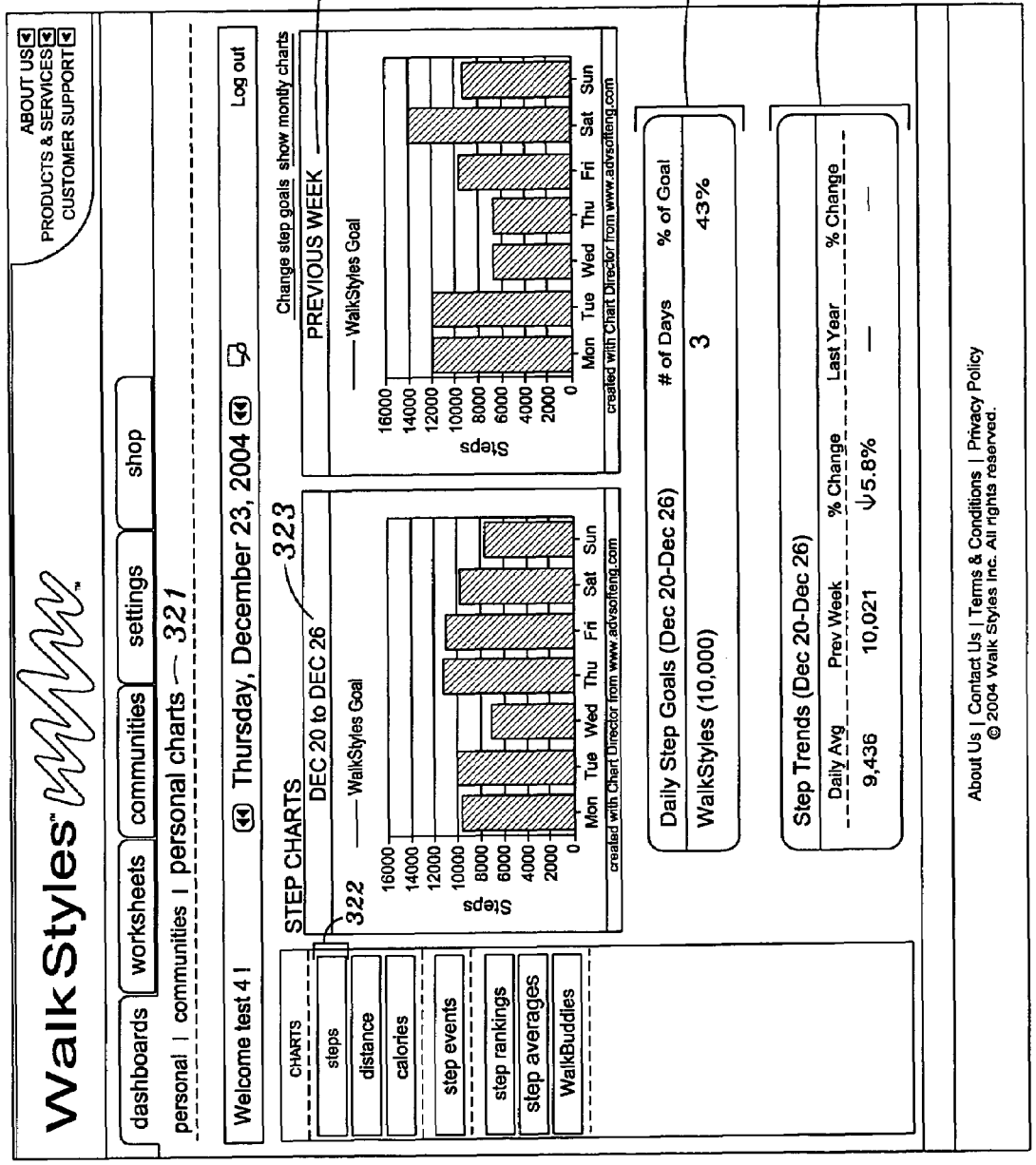
FIG. 18 is a graphic depicting a web page that graphically displays the user's step-related exercise performance parameters that have been measured and determined by the interactive exercise device and uploaded to a server according to one embodiment of the present invention.

FIG. 18 is another example of a web page that a user accesses from server 120 via network 100 and views using computer 110. Web page 320 is shown in FIG. 18, and is accessed by selecting "personal charts" tab 321 and then "steps" button 322. Web page 320 includes current week step chart 323, previous week step chart 324, daily step goals section 325, and step trends section 326. These graphs and data sections of FIG. 18 are self-explanatory and are not further described herein.

Figure 19:
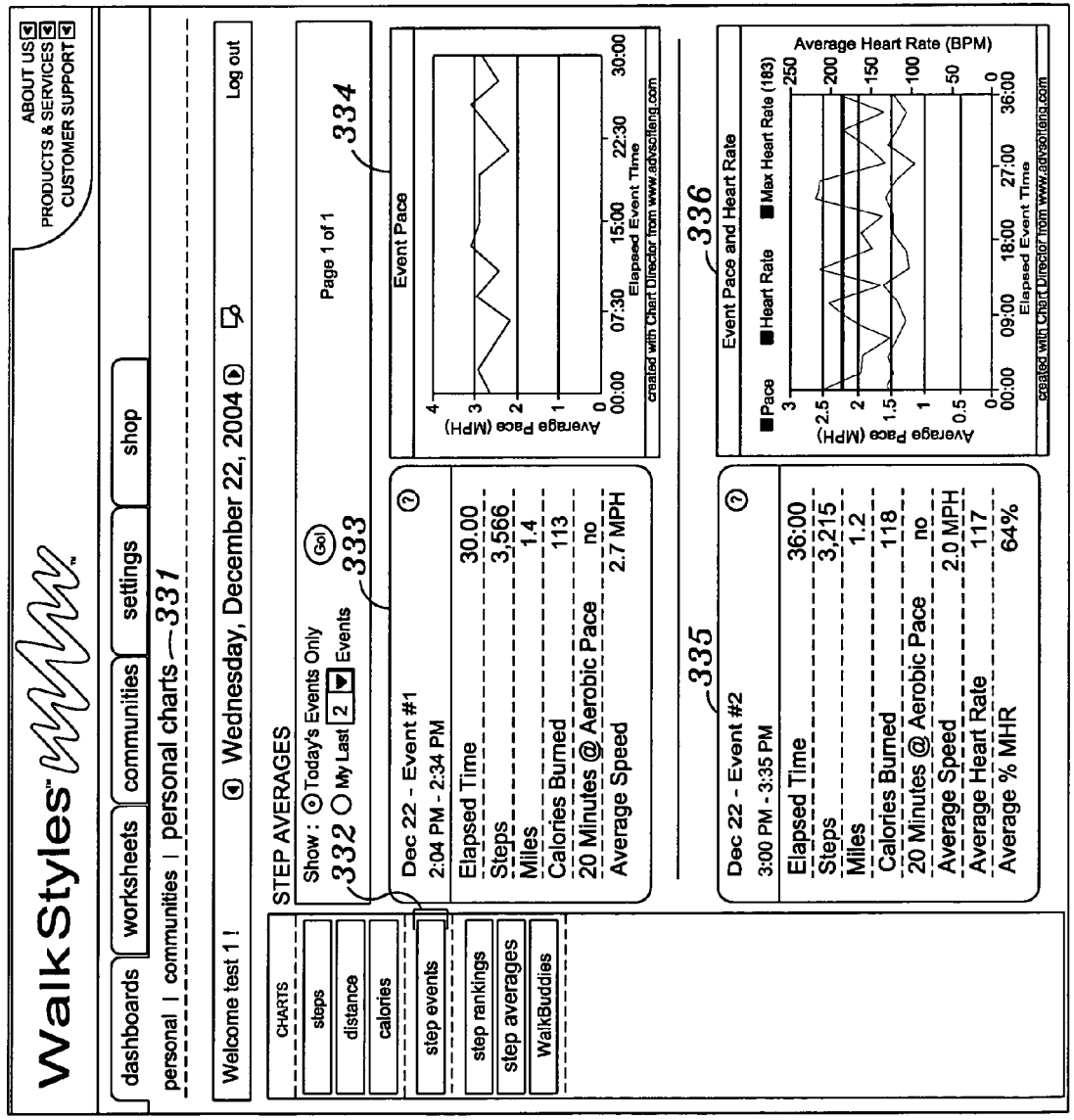
FIG. 19 is a graphic depicting a web page that displays the user's event-related exercise performance parameters that have been measured and determined by the interactive exercise device and uploaded to a server according to one embodiment of the present invention.

FIG. 19 is yet another example of a web page that a user accesses from server 120 via network 100 and views using computer 110. Web page 330 is shown in FIG. 19, and is accessed by selecting "personal charts" tab 331 and then "step events" button 332. Web page 330 displays data for multiple events and includes "event 1" section 333 and "event 2" section 335, each of which display exercise performance parameters corresponding to that particular event measured by interactive exercise device 1. Event pace graph 334 and event pace and heart rate graph 336 are also included in web page 330 and are self-explanatory graphs for displaying the user's speed and/or heart rate during that particular event.

Figure 20:
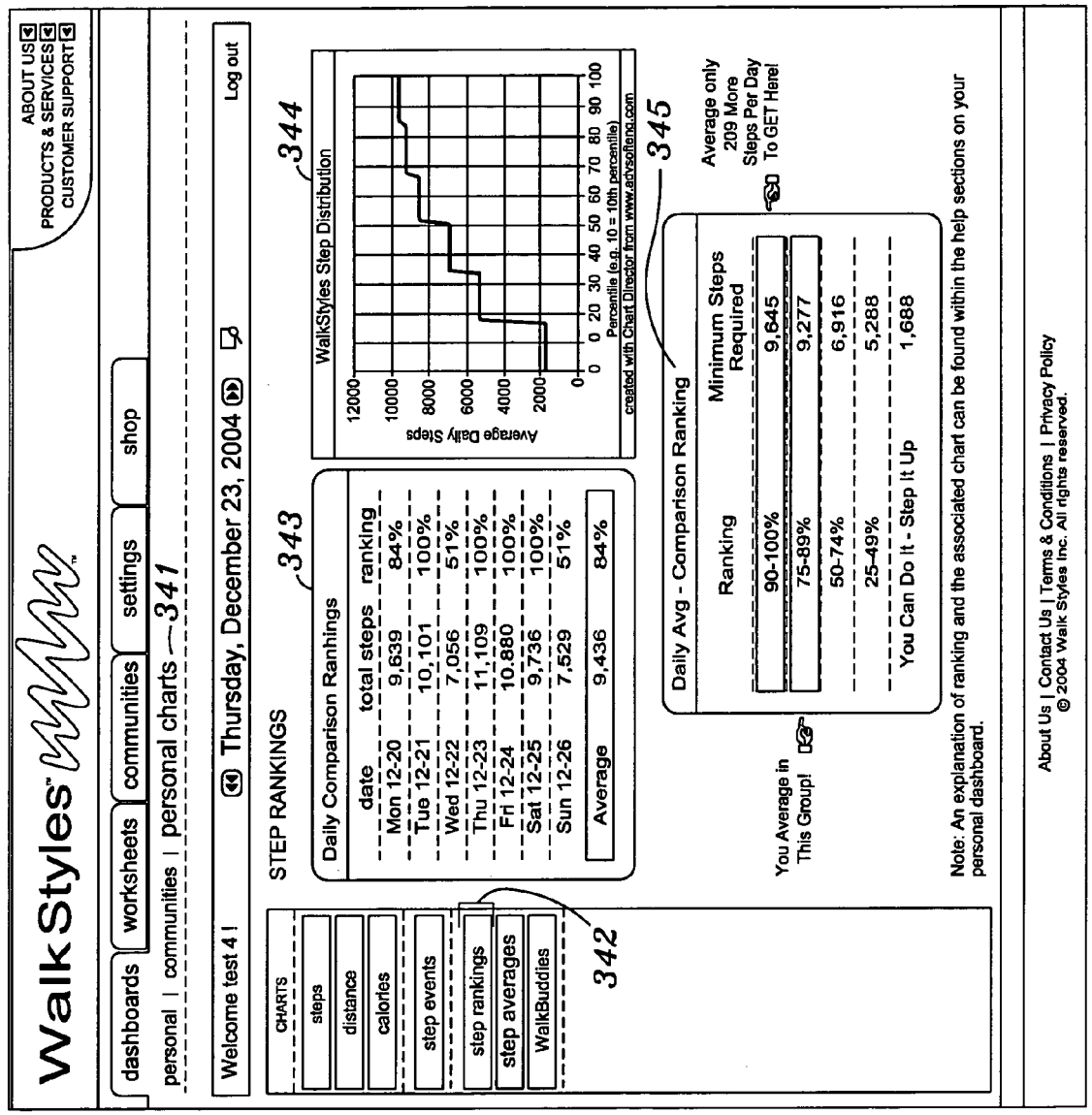
FIG. 20 is a graphic depicting a web page that displays the user's step-rankings based on the exercise performance parameters that have been measured and determined by the interactive exercise device and uploaded to a server according to one embodiment of the present invention.

In FIG. 20, web page 340 is shown and is accessed by selecting "personal charts" tab 341 and then "step rankings" button 342. Web page 340 includes "daily comparison ratings" 343, "step distribution" 344, and "daily average comparison ranking" 345. "Daily comparison ratings" 343 shows the total step count for each day of the past week in comparison to the ranking of that step count in relation to the step counts of all other users of the web site of server 120. "Step distribution" 344 is a graph showing the average step count at each different percentile of users of server 120. "Daily average comparison ranking" 345 shows the minimum number of steps required to reach each level of ranking among all users of server 120.

Figure 21:
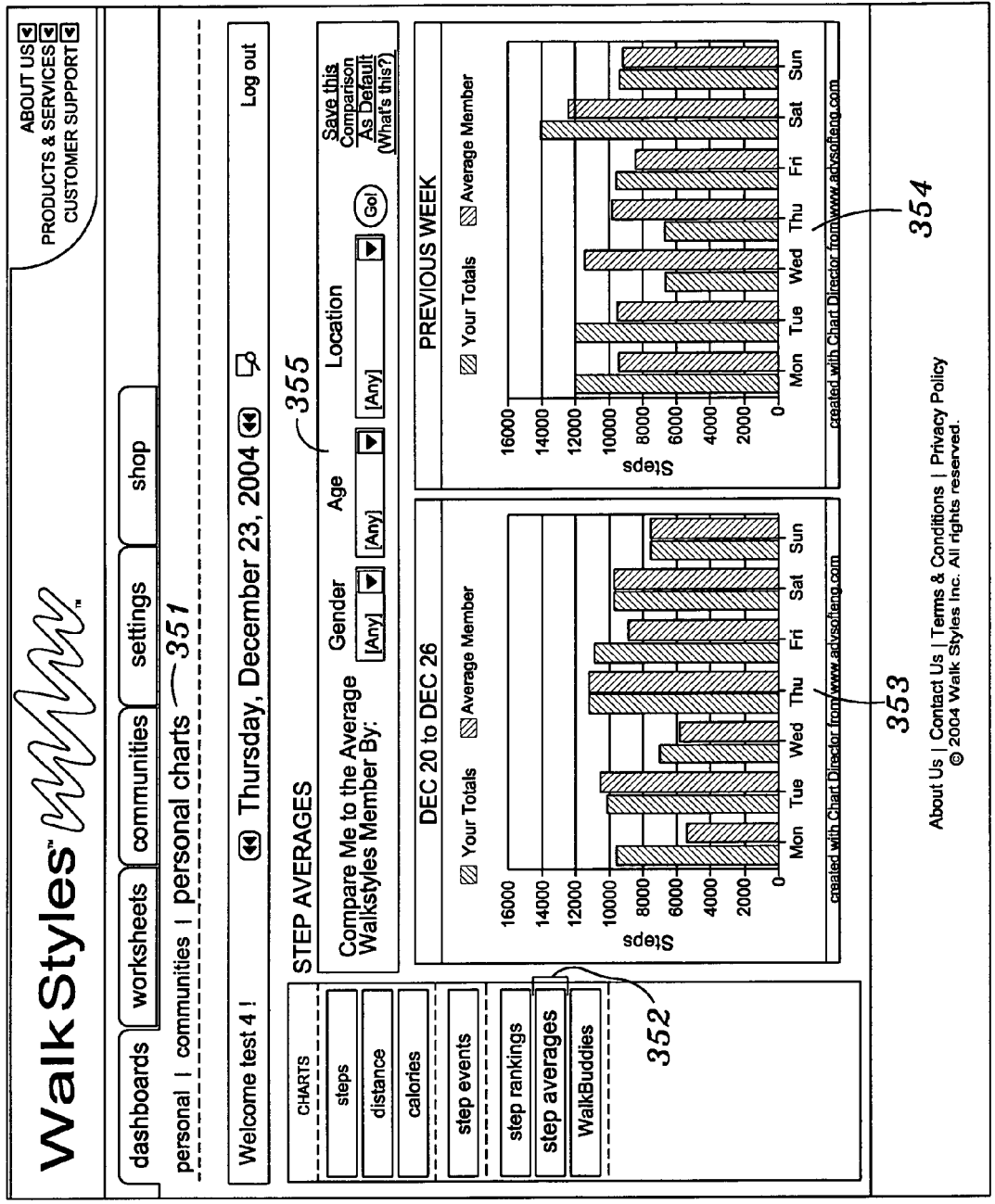
FIG. 21 is a graphic depicting a web page that displays the user's step averages based on the exercise performance parameters that have been measured and determined by the interactive exercise device and uploaded to a server according to one embodiment of the present invention.

Lastly, FIG. 21 shows web page 350, which is accessed by selecting "personal charts" tab 351 and then "step averages" button 352. Web page 350 includes comparison criteria section 355, current week step averages graph 353, and current week step averages graph 354. These sections and graphs are self-explanatory upon viewing FIG. 21 and enable the user to compare the user's step counts for each day of the current and past week to an average of a selected group of users of server 120 that is based upon criteria selected by the user in comparison criteria section 355. In this manner, the user can compare his exercise performance to the average user among users of a particular demographic, such as gender, age and/or location.

By the foregoing description and related drawings, it can be appreciated that the present invention provides a multi-function exercise measuring and monitoring device that has an easily-navigated menu-driven display for monitoring performance parameters and for inputting data, that allows the user to easily download user-specified exercise goals and user-specified personalized notification messages which are displayed by the device upon achievement of the corresponding user-specified goals.

Although the invention has been described with respect to particular illustrative embodiments, it is to be understood that the invention is not limited to the above-described embodiments and that those of ordinary skill in the art can make various changes and modifications without departing from the spirit and scope of the invention described herein.

What is claimed is:

1. An interactive exercise device for measuring and displaying exercise performance parameters, the interactive exercise device comprising:
   a step measuring device that outputs a step signal corresponding to each step walked by a user;
   a processor for determining a plurality of exercise performance parameters based on the step signals output from the step measuring device;
   a memory for storing the determined exercise performance parameters;
   a menu-driven interface display for displaying a plurality of menus, the menus for displaying at least the determined exercise performance parameters;
   a user input device for operation by the user to select a display of one of the menus on the interface display and to provide input data corresponding to a selected display;
   an interface connection for connecting the interactive exercise device to an external computing device, the interface connection supporting an upload of the determined exercise performance parameters from the interactive exercise device to the external computing device, and supporting a download of user-specified data from the external computing device to the interactive exercise device, the user-specified data including at least one user-specified message that is displayed on the interface display when a user-selected one of the determined exercise performance parameters reaches a user-specified threshold;
   a main body in which the step measuring device, the processor, the memory, the menu-driven interface display, the user input device, and the interface connection are disposed;
   a hinged lid connected to the main body by a hinge, the hinged lid forming a clam-shell shape in conjunction with the main body and covering the interface display when closed against a first side of the main body; and
   a detachable face-plate removably attached to a second side of the main body, the detachable face-plate having an integrated latch for latching the hinged lid in a closed position against the first side of the main body.

2. The interactive exercise device of claim 1, wherein the user input device is comprised of a plurality of input buttons.

3. The interactive exercise device of claim 1, wherein the user input device is comprised of a voice command receiver.

4. The interactive exercise device of claim 1, wherein the detachable face-plate has at least one tab that is inserted into at least one slot on the main body to removably attach the detachable face-plate to the second side of the main body.

5. The interactive exercise device of claim 1, wherein the step measuring device includes a balanced lever which is held in tension by a spring, the balanced lever triggering a signal connection to output a step signal corresponding to each step walked by a user.

6. The interactive exercise device of claim 5, wherein the interactive exercise device further includes an adjustment device for adjusting an amount of tension applied to the balanced lever by the spring.

7. The interactive exercise device of claim 1, wherein the processor executes a filter program to filter the step signals received from the step measuring device so as to disregard any step signal that is outside of a predetermined step pattern.

8. The interactive exercise device of claim 1, wherein the interface connection is a standardized serial connection.

9. The interactive exercise device of claim 8, wherein the standardized serial connection is a universal serial bus connection, and wherein, when the interactive exercise device is connected to the external computing device through the universal serial bus connection, the interactive exercise device is recognized as a mass storage device by a windowing operating system being executed by the external computing device.

10. The interactive exercise device of claim 1, wherein the interface connection is a wireless connection, and wherein, when the interactive exercise device is connected to the external computing device through the wireless connection, the interactive exercise device is recognized as a mass storage device by a windowing operating system being executed by the external computing device.

11. The interactive exercise device of claim 1, further including a radio frequency receiver for receiving heart rate information of the user from an external heart rate monitor having a radio frequency transmitter.

12. The interactive exercise device of claim 1, further including a bicycle feedback interface for receiving bicycle rotation information from an external bicycle rotation monitor.

13. The interactive exercise device of claim 1, wherein the menu-driven interface display is a liquid crystal display.

14. The interactive exercise device of claim 13, wherein the liquid crystal display has a backlight for illuminating the display.

15. The interactive exercise device of claim 1, further including a rechargeable battery and an internal charger that charges the rechargeable battery when the internal charger is connected to an external power source.

16. The interactive exercise device of claim 1, wherein the user navigates between the plurality of menus by using the user input device in correspondence with a displayed command on each menu.

17. The interactive exercise device of claim 1, wherein the plurality of menus include a set of top-level menus, each top-level menu corresponding to a top-level function performed by the interactive exercise device.

18. The interactive exercise device of claim 17, wherein at least one of the top-level menus corresponds to a previous-day menu which enables the user to display at least one of the exercise performance parameters retrieved from the memory, the at least one of the exercise performance parameters being determined on a previous day.

19. The interactive exercise device of claim 17, wherein at least one of the top-level menus corresponds to an timed-event menu which enables the user to input parameters for a timed exercise event to be performed by the interactive exercise device.

20. The interactive exercise device of claim 17, wherein at least one of the top-level menus corresponds to an options menu which enables the user to input operating options for the interactive exercise device through the user input device.

21. The interactive exercise device of claim 17, wherein at least one of the top-level menus corresponds to a settings menu which enables the user to input a plurality of setting parameters corresponding to the user, the setting parameters being used by the processor to determine at least one of the exercise performance parameters.

22. The interactive exercise device of claim 1, wherein at least one of the plurality of menus corresponds to a pedometer function which is executed in the processor to enable the interactive exercise device to operate as a pedometer.

23. The interactive exercise device of claim 1, wherein at least one of the plurality of menus corresponds to a clock function which is executed in the processor to enable the interactive exercise device to operate as a clock.

24. The interactive exercise device of claim 1, wherein at least one of the plurality of menus corresponds to an alarm function which is executed in the processor to enable the interactive exercise device to operate as an alarm.

25. The interactive exercise device of claim 1, wherein each top-level menu has a corresponding set of sub-menus, each sub-menu corresponding to a sub-function of the top-level function.

26. The interactive exercise device of claim 2, wherein the user enters data into the interactive exercise device by pressing at least one of the plurality of buttons corresponding to a displayed prompt on a selected one of the plurality of menus.

27. The interactive exercise device of claim 2, wherein the plurality of menus includes a set of user setting menus, and wherein the user enters data representing user settings into the interactive exercise device by pressing at least one of the plurality of buttons corresponding to a displayed prompt on at least one of the plurality of menus.

28. The interactive exercise device of claim 3, wherein the user enters data into the interactive exercise device by entering a voice command into the voice command receiver in correspondence with a displayed prompt on a selected one of the plurality of menus.

29. The interactive exercise device of claim 3, wherein the plurality of menus includes a set of user setting menus, and wherein the user enters data representing user settings into the interactive exercise device by entering a voice command into the voice command receiver in correspondence with a displayed prompt on at least one of the plurality of menus.

30. The interactive exercise device of claim 1, wherein, at a pre-determined time each day, the current values of the determined plurality of exercise performance parameters are stored in the memory as a set of previous data values for subsequent retrieval from the memory, and each of the current values of the determined plurality of exercise performance parameters are set to a predetermined initial value.

31. An interactive exercise system for measuring and displaying exercise performance parameters, the interactive exercise system comprising:

an external computing device having a local processor, a local memory, a local display monitor, an interface connection port, and a local network connection port; a server having a server processor, a server memory, and a server network connection port, the server being connected to the external computing device by a network connection connected to the server network connection port and to the local network connection port of the external computing device, the server sending display pages to the external computing device for display on the local display monitor and the server receiving data from the external computing device; and an interactive exercise device comprising:

a step measuring device that outputs a step signal corresponding to each step walked by a user;

a processor for determining a plurality of exercise performance parameters based on the step signals output from the step measuring device;

a memory for storing the determined exercise performance parameters;

a menu-driven interface display for displaying a plurality of menus, the menus for displaying at least the determined exercise performance parameters;

a user input device for operation by the user to select a display of one of the menus on the interface display and to provide input data corresponding to a selected display;

an interface connection connecting the interactive exercise device to the interface connection port of the external computing device through a data connection;

a main body in which the step measuring device, the processor, the memory, the menu- driven interface display, the user input device, and the interface connection are disposed;

a hinged lid connected to the main body by a hinge, the hinged lid forming a clam-shell shape in conjunction with the main body and covering the interface display when closed against a first side of the main body; and a detachable face-plate removably attached to a second side of the main body, the detachable face-plate having an integrated latch for latching the hinged lid in a closed position against the first side of the main body;

wherein user-specified data is downloaded from the external computing device to the interactive exercise device through the data connection, the user specified data including at least one user-specified message that is displayed on the interface display of the interactive exercise device when a user-selected one of the determined exercise performance parameters reaches a user-specified threshold; and wherein exercise performance parameters are uploaded from the interactive exercise device to the external computing device through the data connection, and are then uploaded from the external computing device to the server through the network connection between the server and the external computing device.

32. The interactive exercise system of claim 31, wherein the user input device is comprised of a plurality of input buttons.

33. The interactive exercise system of claim 31, wherein the user input device is comprised of a voice command receiver.

34. The interactive exercise system of claim 31, wherein at least one of the display pages sent from the server to the external computing device represents a user setting input page, and the user-specified data is entered by the user into a plurality of input fields of the user setting input page displayed on the local display monitor.

35. The interactive exercise system of claim 34, wherein the user setting input page includes input fields corresponding to a user-specified message, a user-selected one of the exercise performance parameters corresponding to the user-specified message, and a user-specified threshold corresponding to the user-selected exercise performance parameter, and wherein the user input data from these input fields is included in the user-specified data that is downloaded from the external computing device to the interactive exercise device.

36. The interactive exercise system of claim 31, wherein at least one of the display pages sent from the server to the external computing device represents a performance parameter page, and at least one of the exercise performance parameters is represented on the performance parameter page displayed on the local display monitor.

37. The interactive exercise system of claim 31, wherein, when the exercise performance parameters are uploaded from the external computing device to the server through the network connection, the exercise performance parameters are stored in a database in relation to an identifier corresponding to the user.

38. The interactive exercise system of claim 34, wherein the exercise performance parameters include time data representing a time at which each of the exercise performance parameters was determined, and the exercise performance parameters are stored in the database in relation to the identifier corresponding to the user and in relation to the time data.

39. The interactive exercise system of claim 32, wherein the user enters data into the interactive exercise device by pressing at least one of the plurality of buttons corresponding to a displayed prompt on a selected one of the plurality of menus.

40. The interactive exercise system of claim 32, wherein the plurality of menus includes a set of user setting menus, and wherein the user enters data representing user settings into the interactive exercise device by pressing at least one of the plurality of buttons corresponding to a displayed prompt on at least one of the plurality of menus.

41. The interactive exercise system of claim 33, wherein the user enters data into the interactive exercise device by entering a voice command into the voice command receiver in correspondence with a displayed prompt on a selected one of the plurality of menus.

42. The interactive exercise system of claim 33, wherein the plurality of menus includes a set of user setting menus, and wherein the user enters data representing user settings into the interactive exercise device by entering a voice command into the voice command receiver in correspondence with a displayed prompt on at least one of the plurality of menus.

43. An interactive exercise system for measuring and displaying exercise performance parameters, the interactive exercise system comprising:

a server having a server processor, a server memory, and a server network connection port; and an interactive exercise device comprising:

a step measuring device that outputs a step signal corresponding to each step walked by a user;

a processor for determining a plurality of exercise performance parameters based on the step signals output from the step measuring device;

a memory for storing the determined exercise performance parameters; a menu-driven interface display for displaying a plurality of menus, the menus for displaying at least the determined exercise performance parameters;

a user input device for operation by the user to select a display of one of the menus on the interface display and to provide input data corresponding to a selected display;

a wireless interface connection that connects the interactive exercise device directly to the server, wherein the server sends user-specified data to the interactive exercise device and the server receives determined exercise performance parameters from the interactive exercise device;

a main body in which the step measuring device, the processor, the memory, the menu-driven interface display. the user input device, and the interface connection are disposed;

a hinged lid connected to the main body by a hinge, the hinged lid forming a clam-shell shape in conjunction with the main body and covering the interface display when closed against a first side of the main body; and a detachable face-plate removably attached to a second side of the main body, the detachable face-plate having an integrated latch for latching the hinged lid in a closed position against the first side of the main body;

wherein the user-specified data includes at least one user-specified message that is displayed on the interface display of the interactive exercise device when a user-selected one of the determined exercise performance parameters reaches a user-specified threshold.

44. The interactive exercise system of claim 43, wherein the user input device is comprised of a plurality of input buttons.

45. The interactive exercise system of claim 43, wherein the user input device is comprised of a voice command receiver.

46. The interactive exercise system of claim 43, wherein, when the exercise performance parameters are sent to the server through the wireless interface connection, the exercise performance parameters are stored in a database in the server in relation to an identifier corresponding to the user.

47. The interactive exercise system of claim 43, wherein the exercise performance parameters include time data representing a time at which each of the exercise performance parameters was determined, and wherein the exercise performance parameters are stored in a database in the server in relation to an identifier corresponding to the user and in relation to the time data.

48. The interactive exercise system of claim 44, wherein the user enters data into the interactive exercise device by pressing at least one of the plurality of buttons corresponding to a displayed prompt on a selected one of the plurality of menus.

49. The interactive exercise system of claim 44, wherein the plurality of menus includes a set of user setting menus, and wherein the user enters data representing user settings into the interactive exercise device by pressing at least one of the plurality of buttons corresponding to a displayed one of the user setting menus.

50. The interactive exercise system of claim 45, wherein the user enters data into the interactive exercise device by entering a voice command into the voice command receiver in correspondence with a displayed prompt on a selected one of the plurality of menus.

51. The interactive exercise system of claim 45, wherein the plurality of menus includes a set of user setting menus, and wherein the user enters data representing user settings into the interactive exercise device by entering a voice command into the voice command receiver in correspondence with a displayed one of the user setting menus.

* * * * *